Jan. 23, 1968   P. J. SCHMITZ ET AL   3,364,827
PROGRAMMING CONSOLE FOR COUNTER STACKER
Filed Nov. 19, 1965   12 Sheets-Sheet 1

Inventors
Paul J. Schmitz
Harlan J. Taft
By Wm. A. Autio
Attorney

Jan. 23, 1968 P. J. SCHMITZ ET AL 3,364,827
PROGRAMMING CONSOLE FOR COUNTER STACKER
Filed Nov. 19, 1965 12 Sheets-Sheet 3

| ROWS ON PUNCH CARDS | | 12 | 11 | 0 | 1 | 2 | 3 | 4 | 5 | 6 | 7 | 8 | 9 | | | | | | | | CLUTCH LATCH 310° |
|---|---|---|---|---|---|---|---|---|---|---|---|---|---|---|---|---|---|---|---|---|---|
| DEGREES OF ROTATION OF CARD READER | | 0 | 18 | 36 | 54 | 72 | 90 | 108 | 126 | 144 | 162 | 180 | 198 | 216 | 234 | 252 | 270 | 288 | 306 | 324 | 342 360 |
| MAKE | CBS2 | 10° | | 46° | | 82° | | 118° | | 154° | | 190° | | | | | | | | | |
| BREAK | CBS3 | | 15° | | 51° | | 87° | | 123° | | 159° | | 195° | | | | | | | | |
| MAKE | CBS4 | | 28° | | 64° | | 100° | | 136° | | 172° | | 208° | | | | | | | | |
| BREAK | CBS5 | | 33° | | 69° | | 105° | | 141° | | 177° | | 213° | | | | | | | | |
| | CBS6 | | | | | | | | | | 215° | | | | | | | | | 325° | |
| | CBS7 | | | | | | | | | 200° | | | | | | | | 320° | | | |
| HOLES IN CARD | | | | | 62° 71° | | | 116° 125° | 134° 143° | | | | | | | | | | | | |

Jan. 23, 1968  P. J. SCHMITZ ETAL  3,364,827
PROGRAMMING CONSOLE FOR COUNTER STACKER
Filed Nov. 19, 1965  12 Sheets-Sheet 12

Inventors
Paul J. Schmitz
Harlan J. Taft
By Wm. A. Autio
Attorney

United States Patent Office 3,364,827
Patented Jan. 23, 1968

3,364,827
PROGRAMMING CONSOLE FOR
COUNTER STACKER
Paul J. Schmitz, Sussex, and Harlan J. Taft, Hales
Corners, Wis., assignors to Cutler-Hammer, Inc.,
Milwaukee, Wis., a corporation of Delaware
Filed Nov. 19, 1965, Ser. No. 508,660
11 Claims. (Cl. 93—93)

This invention relates to programming consoles for counter stackers or the like and more particularly to a console which can be readily moved to and functionally associated with any one of a pluarlity of counter stackers for programming the counting functions thereof to provide for variable numbers of articles in the stacks under the control of information bearing media and for delivering such media for use as address labels on the stacks.

While not limited thereto, the invention is especially applicable to programming of the counting functions of a newspaper counter stacker to which newspapers are delivered in a high speed stream.

Theodore B. Jochem Patent No. 3,006,258 dated Oct. 31, 1961, discloses a programming control system which is intended to be permanently associated with a newspaper stacker. The stacker is located at the end of a conveyor which delivers the newspapers in partially overlapped relation with the folded edges leading. The newspapers are ejected from between a pair of pincher rolls which can be tripped, that is, pivoted up so as to cause an intercept blade to start receiving the newspapers at the end of the formation of each batch. A counter ahead of the pincher rolls counts the newspapers as they approach the stacker and the latter forms the newspapers into batches each having the desired number according to the program. As each batch is formed, the stream is intercepted by tripping the pincher rolls and the completed batch is dropped onto a table whereafter the table may be selectively lowered to deliver the batch or may be rotated 180 degrees to allow a second batch to drop on the first batch with its folded edges reversed relative to the first batch. A punched card for each batch controls the number of papers therein and also tells the stacker whether to rotate the table or whether to deliver. On delivery, the table is lowered around rotating rollers which convey the stack onto a stack delivery conveyor. The table is then raised in preparation for the formation of a second stack. Each batch contains the number of newspapers read from the punched card respectively associated therewith. Therefore, if a stack is to have more than one batch, a plurality of punched cards must be read in direct sequence to form the stack.

The present invention relates to improvements over programming systems of the aforesaid type.

A general object of the invention is to provide an improved program control system for an article stacker.

A more specific object of the invention is to provide a portable program control unit which can be rolled up to and readily connected for use with any one of a plurality of stackers.

Another specific object of the invention is to provide an improved program control unit for a newspaper stacker wherein the punched cards which control the number of newspapers in the respective stacks are also glued and delivered to a pile of top wrap for manual application to the associated stacks for use as pre-addressed labels thereon.

Another specific object of the invention is to provide an improved program control unit of the aforesaid type and enclosed as a portable console and incorporating a card reader, a decimal to binary translator for presetting the stacker counters and an automatic gluing system for applying glue to the punched cards after they have been read.

Another specific object of the invention is to provide an improved program control console of the aforesaid type having means affording selective programmed operation wherein each stack is formed in accordance with the information on a single punched card or bulk operation wherein all stacks are formed in accordance with the setting of manual selector switches.

Other objects and advantages of the invention will hereinafter appear.

According to the invention, there is provided a stack programming and address label applying console for a newspaper counter stacker. This console is a portable self-contained unit whereby it can be rolled up to and electrically plug-connected to control any newspaper counter stacker. This console is provided with a card reader for reading information from punched cards indicating the number of newspapers per batch, the number of batches per stack and an $N-1$ code, when present, indicating that the second and alternate batches in a stack will have one less newspaper whereby to provide any desired number of newspapers in a stack. This console is also provided with a relay panel having means for translating the decimal or space code read from the card into a binary code and for registering this binary code so that it is available for use at the proper time to preset the binary counters in the newspaper counter stacker. This console also is provided with a card transport or conveyor for conveying each card after it has passed the reading head out of the console and dropping it on the top of a pile of newspaper stack top wrap, these being sheets of kraft paper or the like which are manually placed on top of the newspaper stacks before they go into the wire tier. This console is also provided with an electro-pneumatic gluing system which functions to apply a plurality of stripes of glue to the bottom of the card as it is transported out of the console which sticks it to the top wrap. This console is further provided with a control and indicating panel whereby the system can be controlled and its operational conditions indicated.

These and other objects and advantages of the invention and the manner of obtaining them will best be understood by reference to the following description of an embodiment of a programming console for counter stacker taken in conjunction with the accompanying drawings, wherein.

Figure 1:
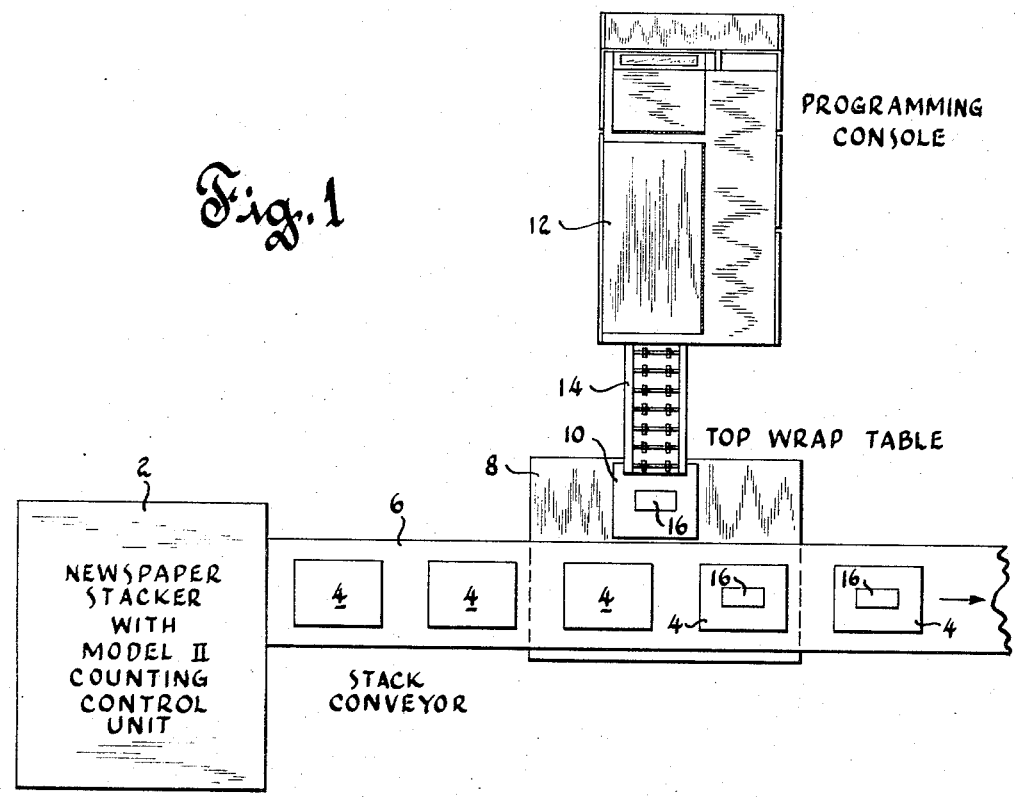
FIGURE 1 is a top plan view of a newspaper handling system including a programming console constructed in accordance with the invention.

Referring to FIG. 1, there is shown a newspaper handling system in which the programming console may be used. This system includes a newspaper counter stacker 2 for receiving newspapers from a high speed lapped stream and for delivering stacks 4 of newspapers onto an outgoing conveyor 6. A table 8 is located adjacent conveyor 6 near the counter stacker and has a pile of top wrap 10 thereon. Console 12 is positioned opposite the top wrap table so that its hinged card transport 14 extends onto the table over the pile of top wrap for delivering punched cards 16 thereto.

In the system of FIG. 1, a card reader in the console reads a punched card for each stack and presets the counters in the stacker to complements of desired numbers. That is, the tens and units counters which count the number of newspapers for the stack are set to complements of 10 and 9, respectively, or collectively to a complement of 109. The counter which counts the number of batches for the stack is set to a complement of 8. And the $N-1$ code indication, that is, an indication that every second batch should have one less newspaper than is called for by the punched card, if present, is registered on a relay.

The counters in the stacker then count the newspapers arriving therein and form batches and rotate the batches to place the folded edges of the papers on opposite sides and form stacks which are ejected onto the outgoing conveyor which carries them in spaced apart relation past the top wrap table. In the meantime, the punched card which was read in the console is ejected from the card reader into a card transport which carries it past a row of glue ports from which glue is automatically ejected to form stripes of glue across the bottom of the punched card. The card then continues on its way and is conveyed by the hinged transport out of the console and is dropped on the pile of top wraps. This punched card arrives on the pile of top wraps just ahead of or coincident with the arrival of the associated newspaper stack by the table. The attendant or operator who stands next to the table takes the top sheet from the pile of top wraps and places it on the newspaper stack that is passing by. The stack then continues on its way along the conveyor toward the wire tier. A bottom wrap is automatically placed below the stack and a wire is then wrapped around the stack by the wire tier to tie the stack into a secure bundle.

Figure 2:
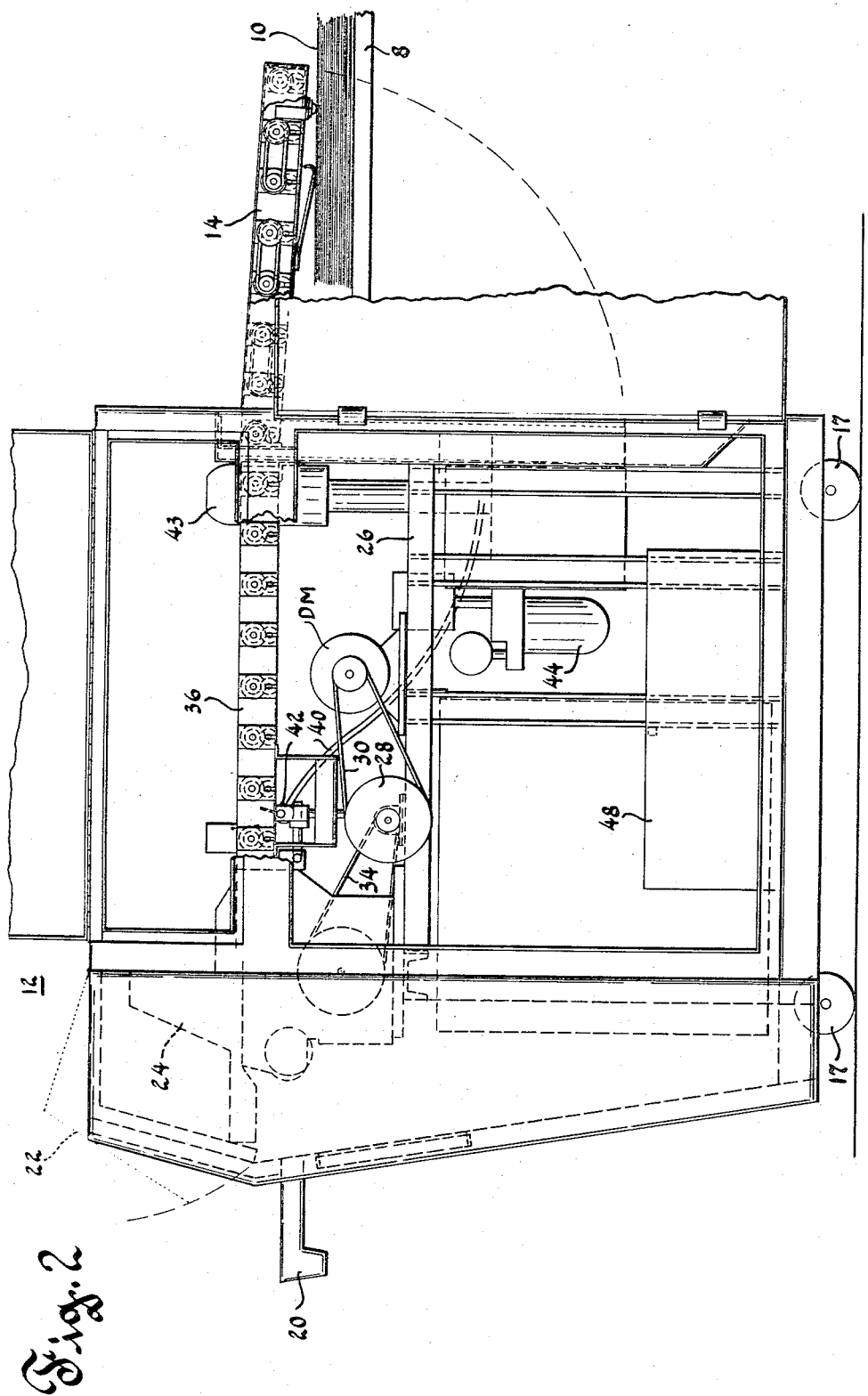
FIG. 2 is a right side elevational view of the console with the side doors open to show the interior mechanism from one direction.
Figure 3:
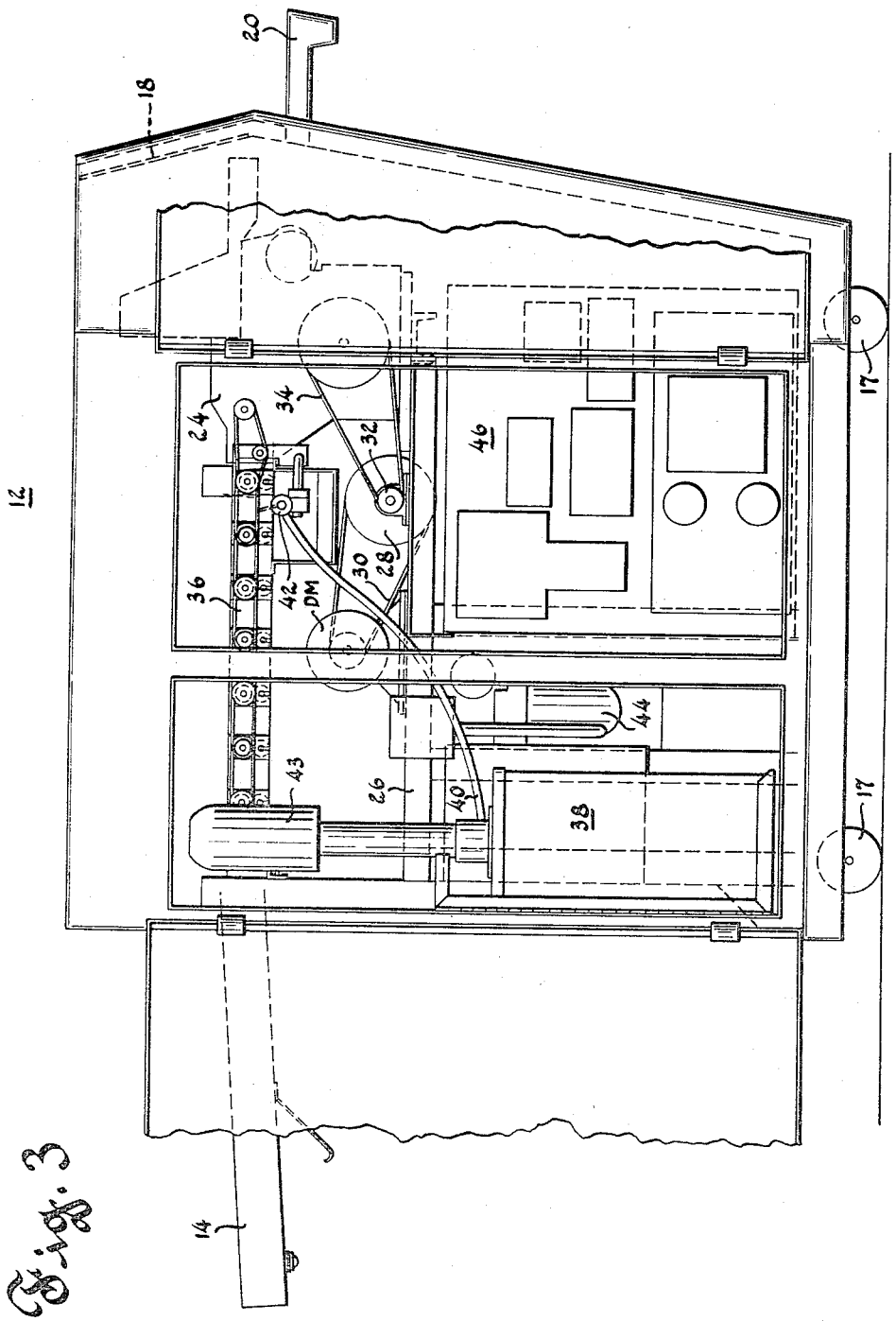
FIG. 3 is a left side elevational view of the console with the side doors open to show the interior mechanism from opposite direction.
Figure 4:
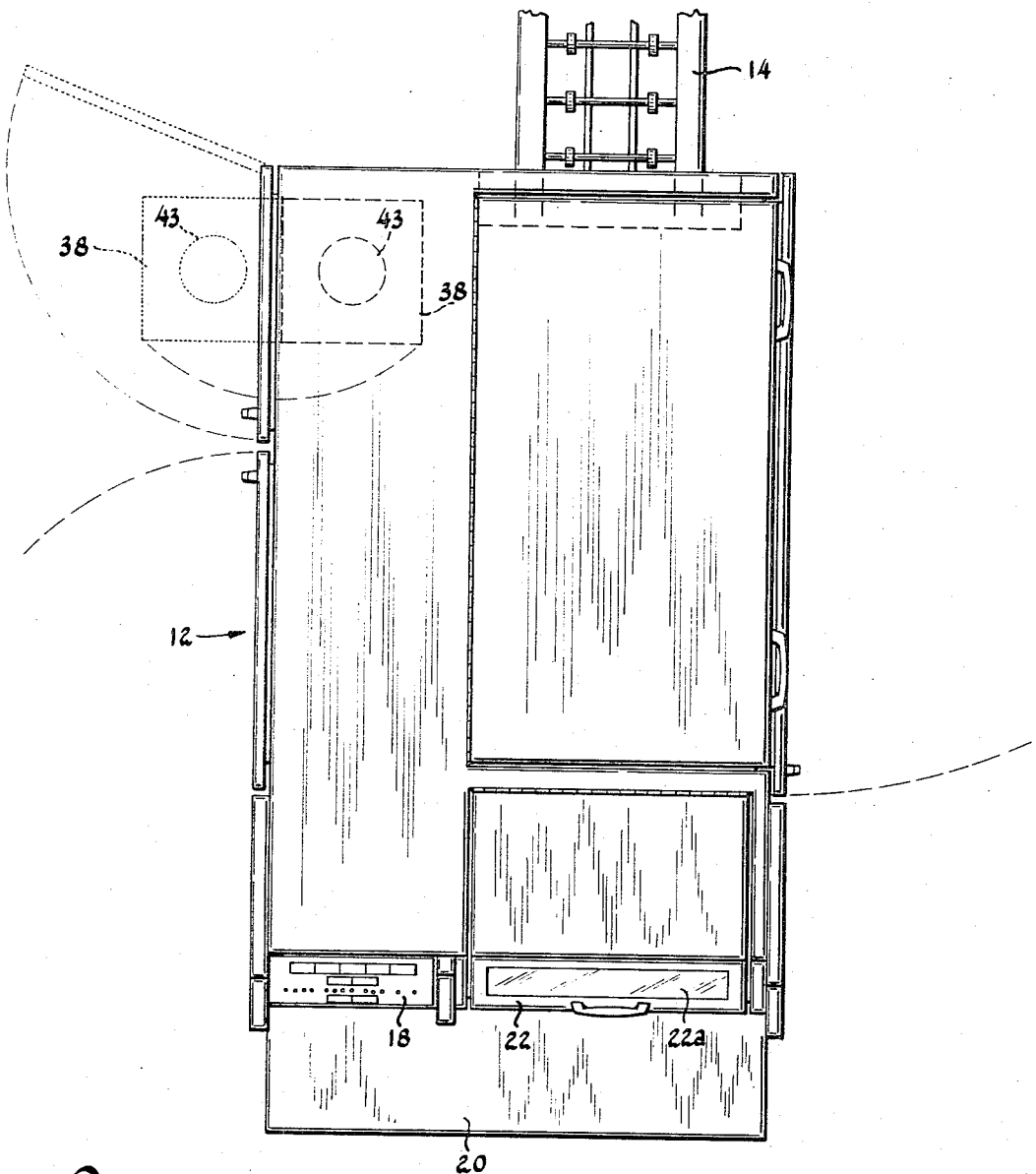
FIG. 4 is a top plan view of the console of FIGS. 2 and 3 with the hinged card transport partly broken away.

As shown in FIGS. 2 to 4, the programming console is provided with a metal enclosure completely enclosing its internal mechanism with the hinged transport extending from the rear end so that it can be lifted onto a table. This external transport is hinged so that it will automatically adjust to different heights of top wrap piles and will hang along the rear wall to take up less space in shipment.

The console is provided with wheels 17 so that it can be readily moved to and connected to any newspaper counter stacker. At the upper left there is provided a control panel 18 shown in FIG. 4, above a shelf 20 on the front wall. This control panel is provided with pushbuttons and light indicators and is shown in more detail in FIG. 6. At the upper right of the front wall above the shelf is a hinged cover or door 22 which can be lifted to expose a hopper for punched cards. This door has a glass window 22a as shown in FIG. 4 to show the punched cards when the door is closed. Directly behind this hopper is a card reader 24.

Figure 7:
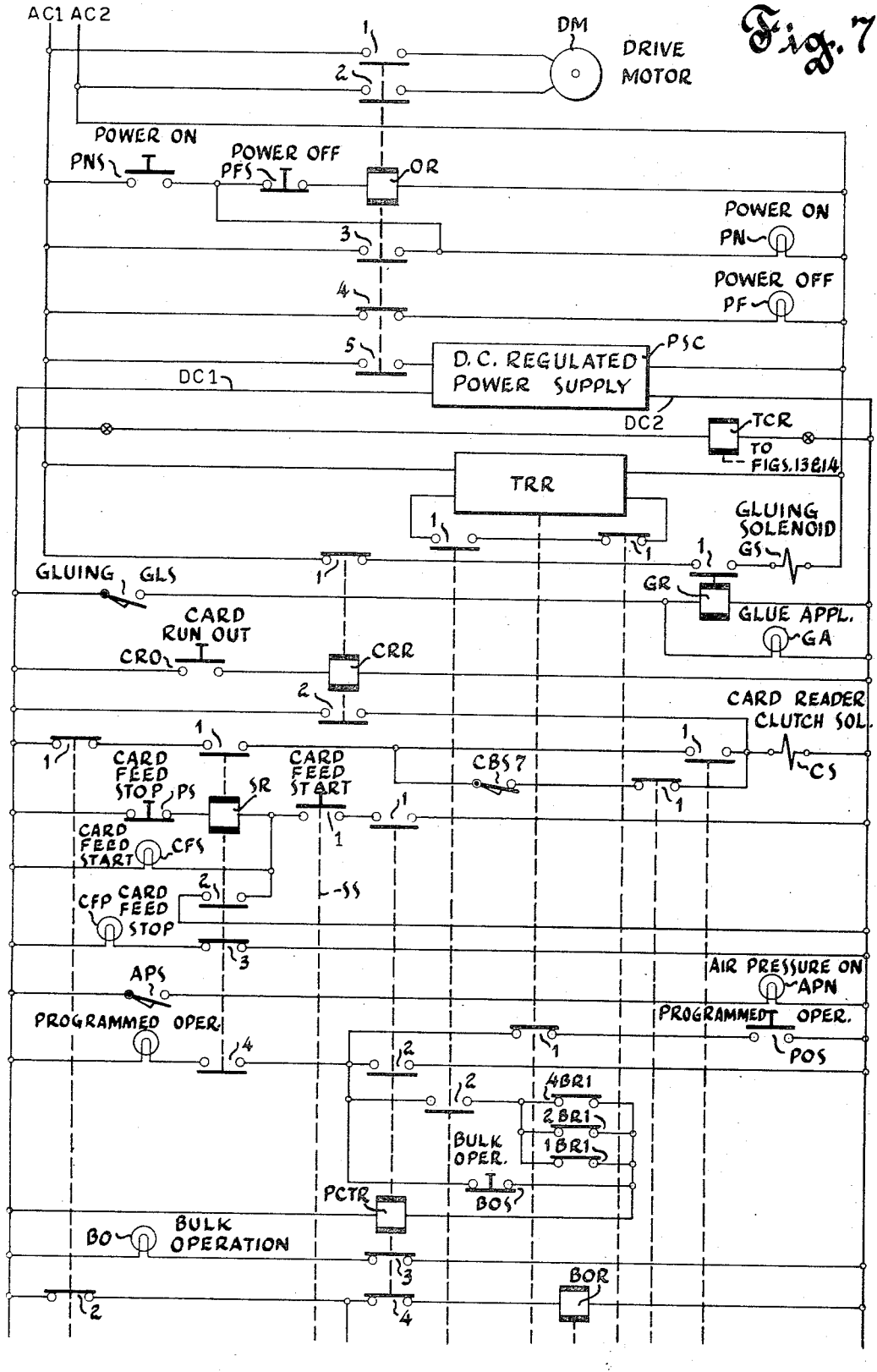
FIGS. 7 to 11 are circuit diagrams of the control system mounted in the console.

As shown in FIG. 2, an electric drive motor DM, also shown in FIG. 7, is mounted on a pair of cross bars 26 and drives a speed reduction pulley 28 through a timing belt 30. Pulley 28 is connected through a shaft to a small pulley 32 shown in FIG. 3 which drives the card reader through a timing belt 34. A card transport 36 extends from the card exit at the back of the card reader to hinged transport 14 and is powered from the card reader through timing belts. The hinged section of the card transport is powered from the stationary section thereof through timing belts.

As shown in FIG. 3, a glue tank 38 is located within the console and is provided with a hose 40 through which glue is forced to a manifold 42. This manifold is positioned below the path of the punched cards and has four plastic tubes extending at an upward angle therefrom through which glue is applied to the bottom of the card as it rubs against the ends of these tubes in its travel. The gluing system is also provided with a pump 43 and a meter control 44 for regulating the proper feeding of the glue.

The panel 46 at the lower right-hand portion of the console in FIG. 3 contains electrical control elements such as a transformer, timer, etc. Panel 48 shown in FIG. 2 contains the relays of the system shown in FIGS. 7–11. The console is provided with doors on opposite sides and a top cover as shown in FIG. 4 all of which can be opened to afford access to the mechanism within the enclosure.

Figure 5:
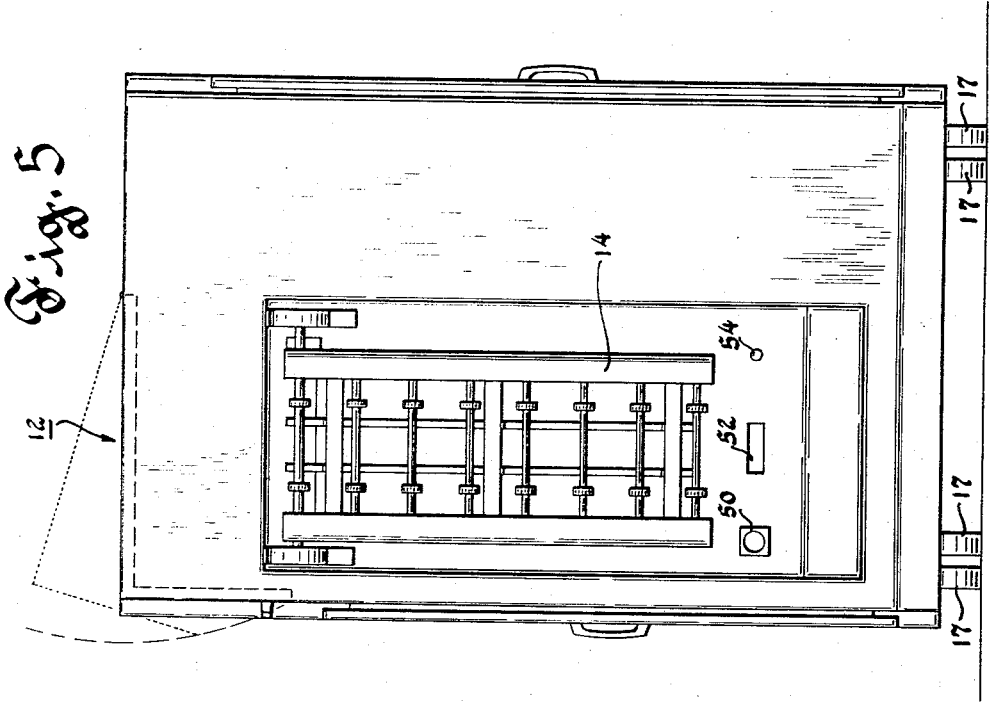
FIG. 5 is a rear end elevational view of the console of FIGS. 2–4 showing the hinged card transport in its down position.

As shown in FIG. 5, the rear wall is provided with a power connection 50 for bringing in electrical power, a stacker connection 52 for plugging the program controller into the stacker counter as hereinafter more fully described and shown in FIGS. 7–11, 13 and 14 and an air line connection 54 for bringing in compressed air to operate the gluing system.

Figure 6:
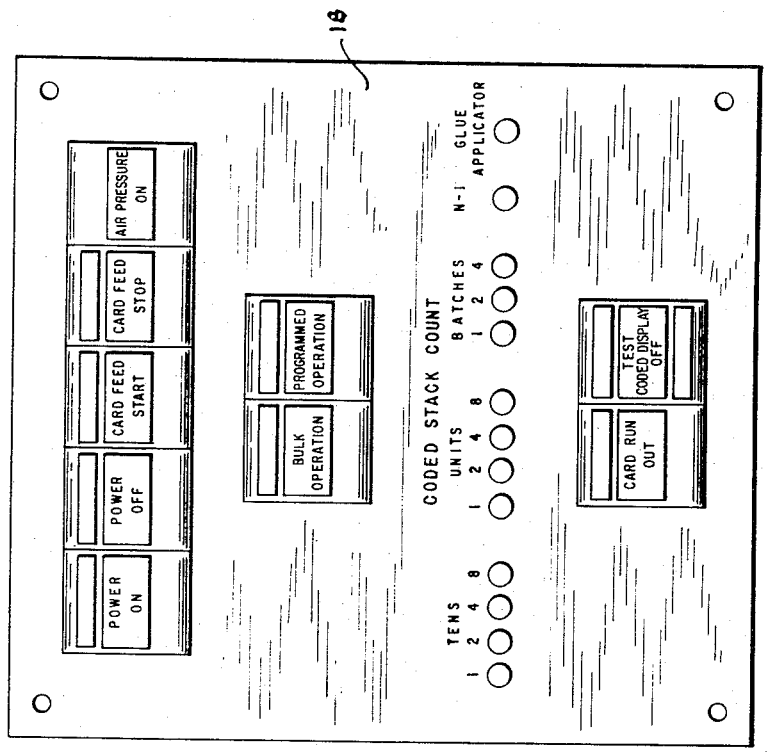
FIG. 6 is a front elevational view of the control panel.

The control panel shown in FIG. 6 is provided with pushbutton switches and indicator lamps which are also shown in FIGS. 7–11 for controlling the operation of the system and for indicating a number of operating condition. This control panel includes pushbuttons for putting power on and off, for starting and stopping the card feed from the hopper into the card reader, for switching from bulk operation to programmed operation, that is, from uniform stacks to programmed stacks, for running all the cards out of the hopper without reading or gluing them and for putting the coded stack count lamps on or off. This control panel includes lamps to indicate power on or off, card feed start or stop, air pressure on, bulk operation or programmed operation and glue applicator on. This control panel also includes lamps which function when the coded display test button has been pressed to indicate in binary form the number registered on the newspaper count tens and units register relays and the number registered on the batch count register relays and to indicate an $N-1$ condition calling for one less newspaper in the second and alternate batches.

The system shown in FIGS. 7–11 is housed within the console except for relay TCR, FIG 7, which is mounted in the counter stacker and is connected to the control system in the console through stacker connection 52, FIG. 5, as shown by the encircled X's in FIG. 7. The stacker counting control system shown in FIGS. 13–14 is housed within counter stacker 2 except for relays LBS and RER and contacts of relays NRR, STCR, 8TR, 4TR, 2TR, 1TR, 8UR, 4UR, 2UR, 1UR, 4BR, 2BR and 1BR which are in the console and are connected through connection 52 to the stacker counting control system as shown by the encircled X's in FIGS. 13 and 14.

Figure 13:
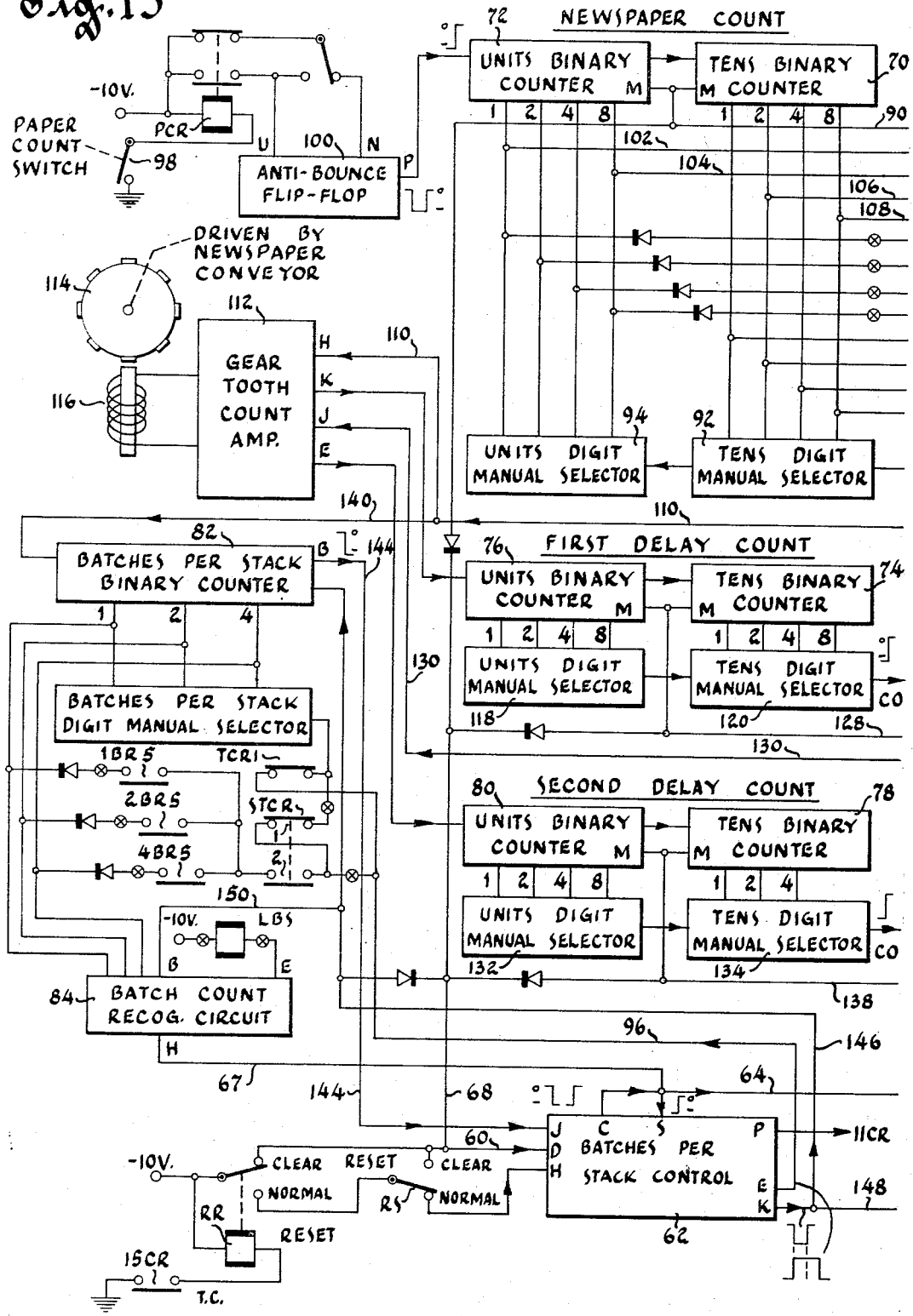
FIGS. 13 and 14 show a block diagram of the stacker counting control unit including circuit diagrams showing its connections to the system of FIGS. 7–11.
Figure 14:
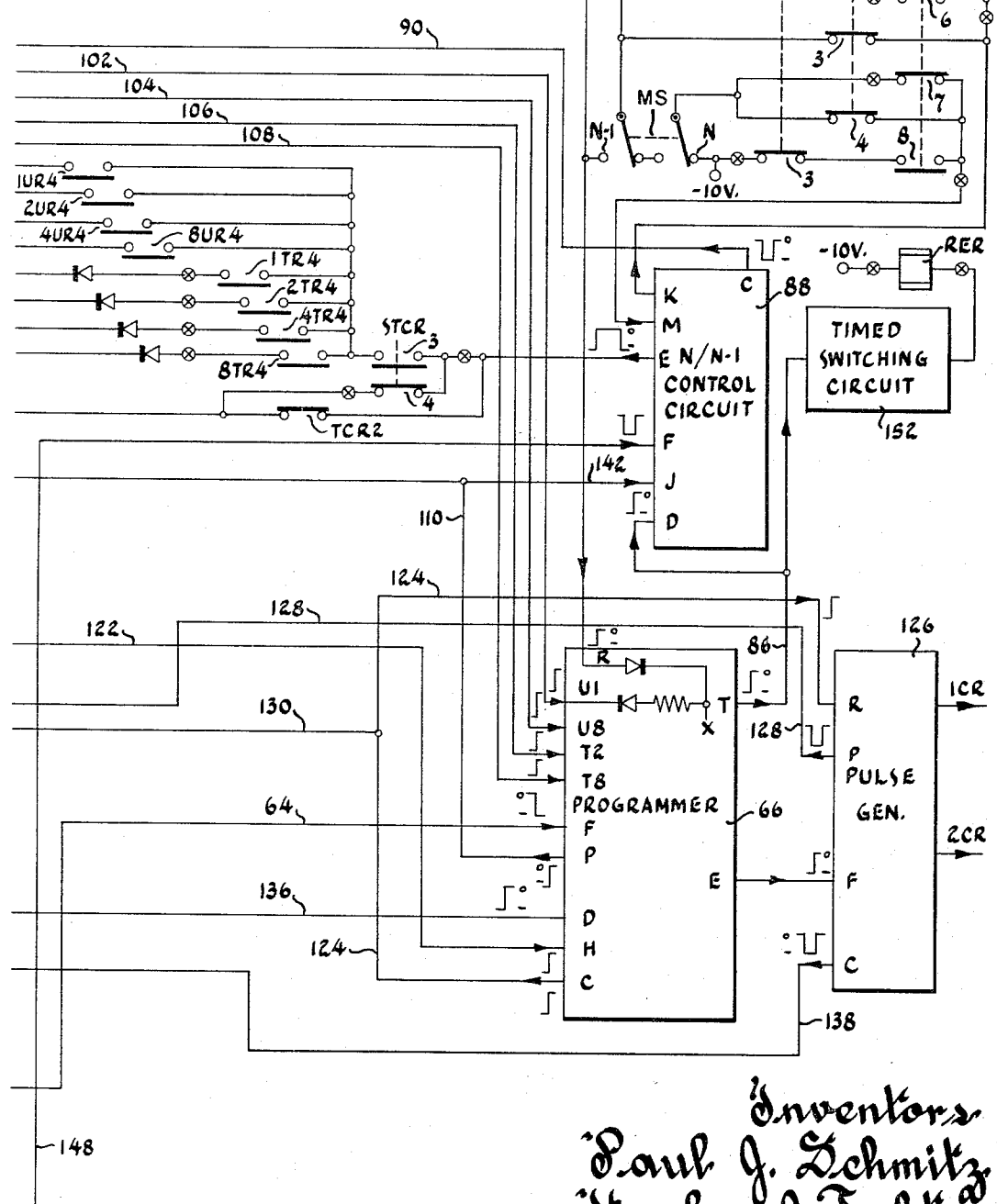

The stacker counting control unit is shown schematically in FIGS. 13 and 14 to avoid complicating the drawings, there being included only enough detail to show how the connections are made to the programming control system of FIGS. 7–11. The stacker counting control unit of FIGS. 13 and 14 with its manual inputs for information is known and available from Cutler-Hammer, Inc., as the Model II Stacker Counting Control Unit. When it is connected to the programming control system of FIGS. 7–11, this stacker counting control unit functions as it does in independent operation except that now the information regarding the number of newspapers in each batch, the number of batches in each stack, the $N-1$ operation and reset after the formation of each stack is put in automatically from the programming console rather than from the manual selectors and manual switches that have been used for these purposes heretofore. Due to the speed with which the card reader can operate, this information can be different for each stack whereas under manual control the stacks are of uniform size, these being called programmed operation and bulk operation, respectively.

The manner in which the programming control system of FIGS. 7-11 operates will first be described followed by a general description of the block diagram stacker counting control unit of FIGS. 13 and 14.

When an alternating current source is connected across power supply lines AC1 and AC2 in FIG. 7 preparatory to operation of the system, power off indicator lamp PF is lit in a circuit extending through contact 4 of on-off relay OR and timer TRR is energized across lines AC1 and AC2 to prepare it for timing operation upon closure of its external circuit as hereinafter described.

Figure 8:
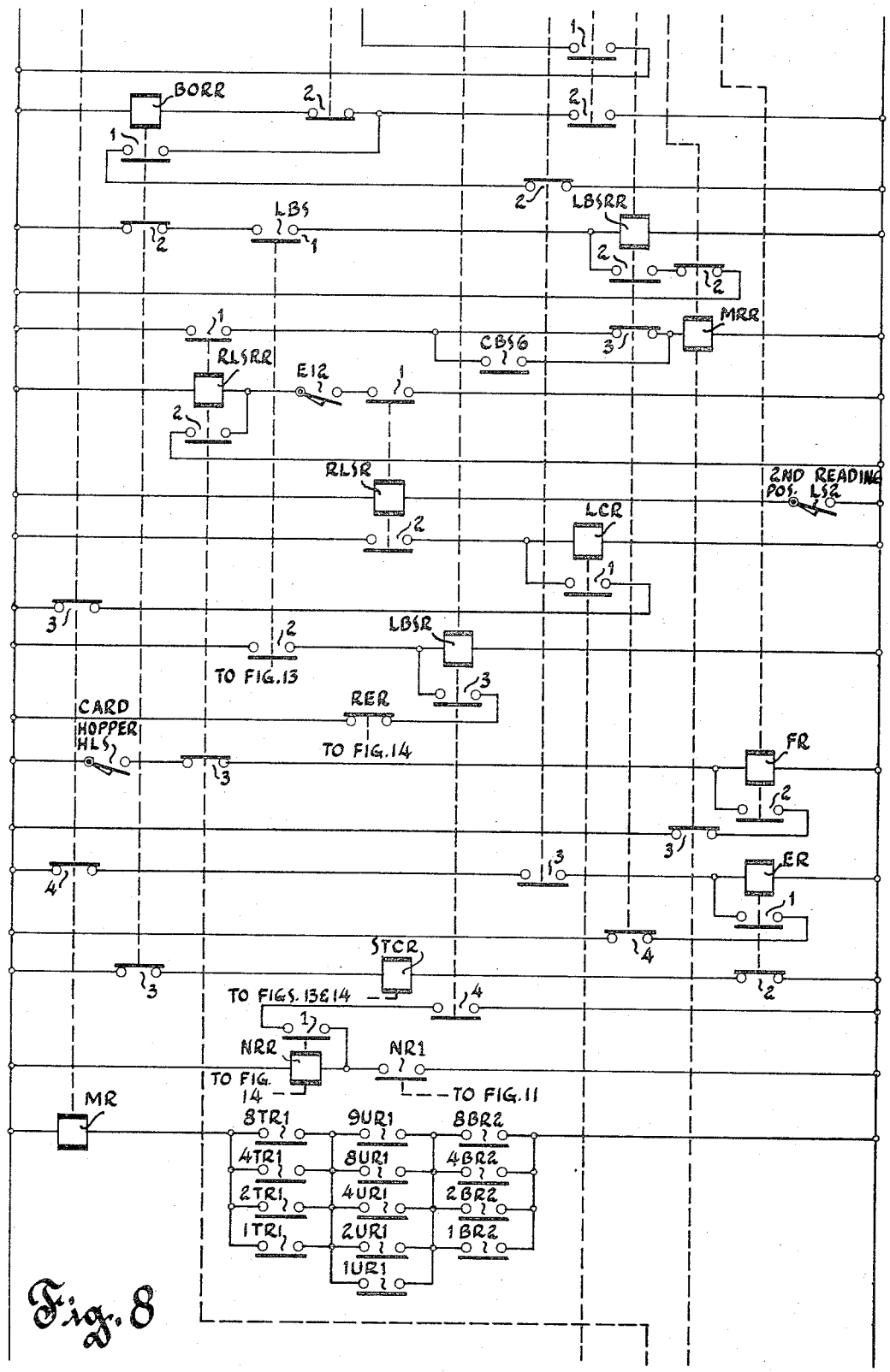

When a pile of punched cards is placed in the hopper of the card reader, card hopper limit switch HLS in FIG. 8 closes to connect a feed relay FR through contact 3 of reading auxiliary relay RSLRR across direct current supply lines DC1 and DC2. When a supply of compressed air is connected to the gluing system, air pressure switch APS in FIG. 7 closes to connect air pressure "on" indicator lamp APN across D.C. lines DC1 and DC2 before D.C. power is connected thereto.

Figure 9:
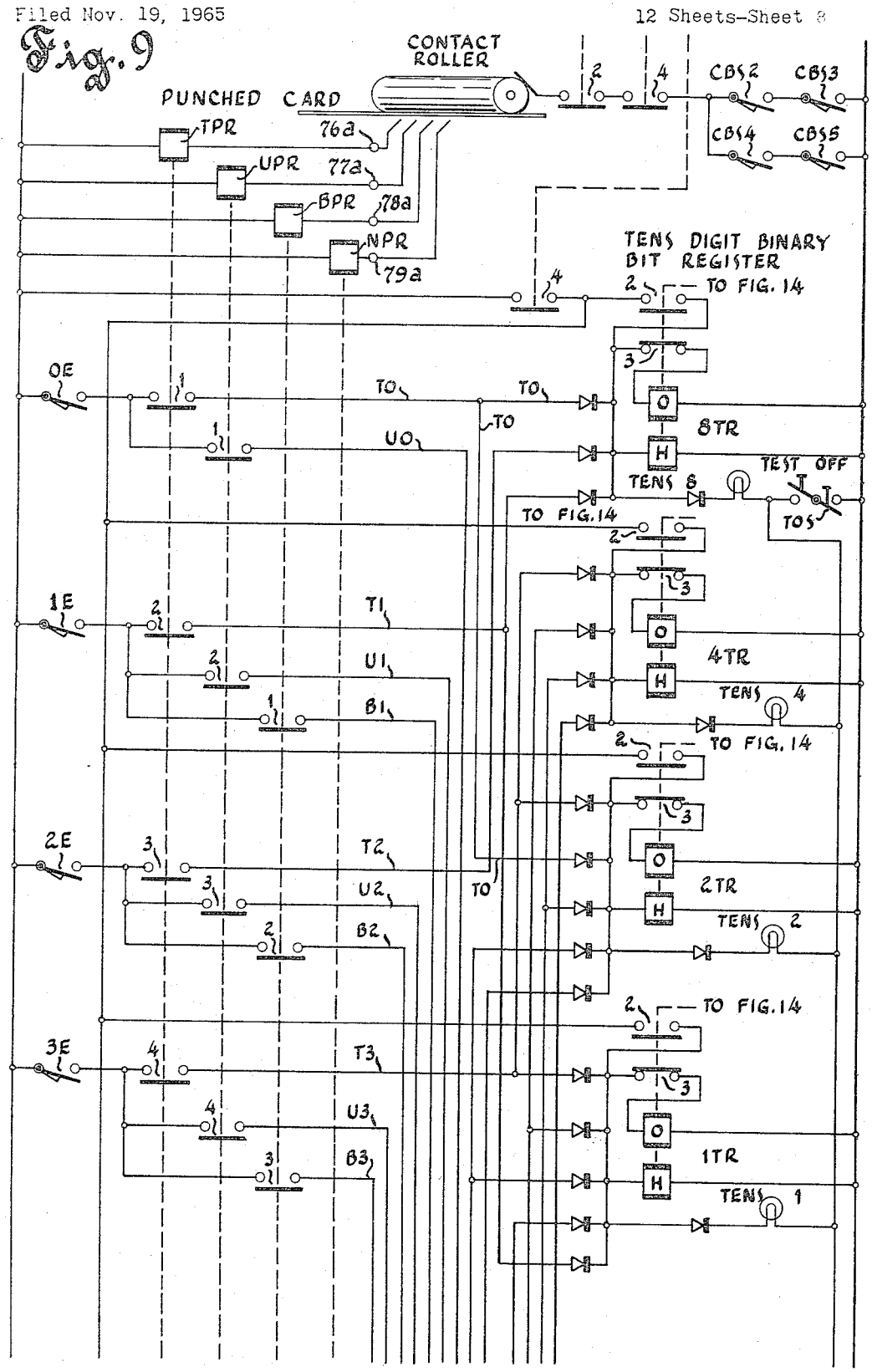
Figures 11, 12:
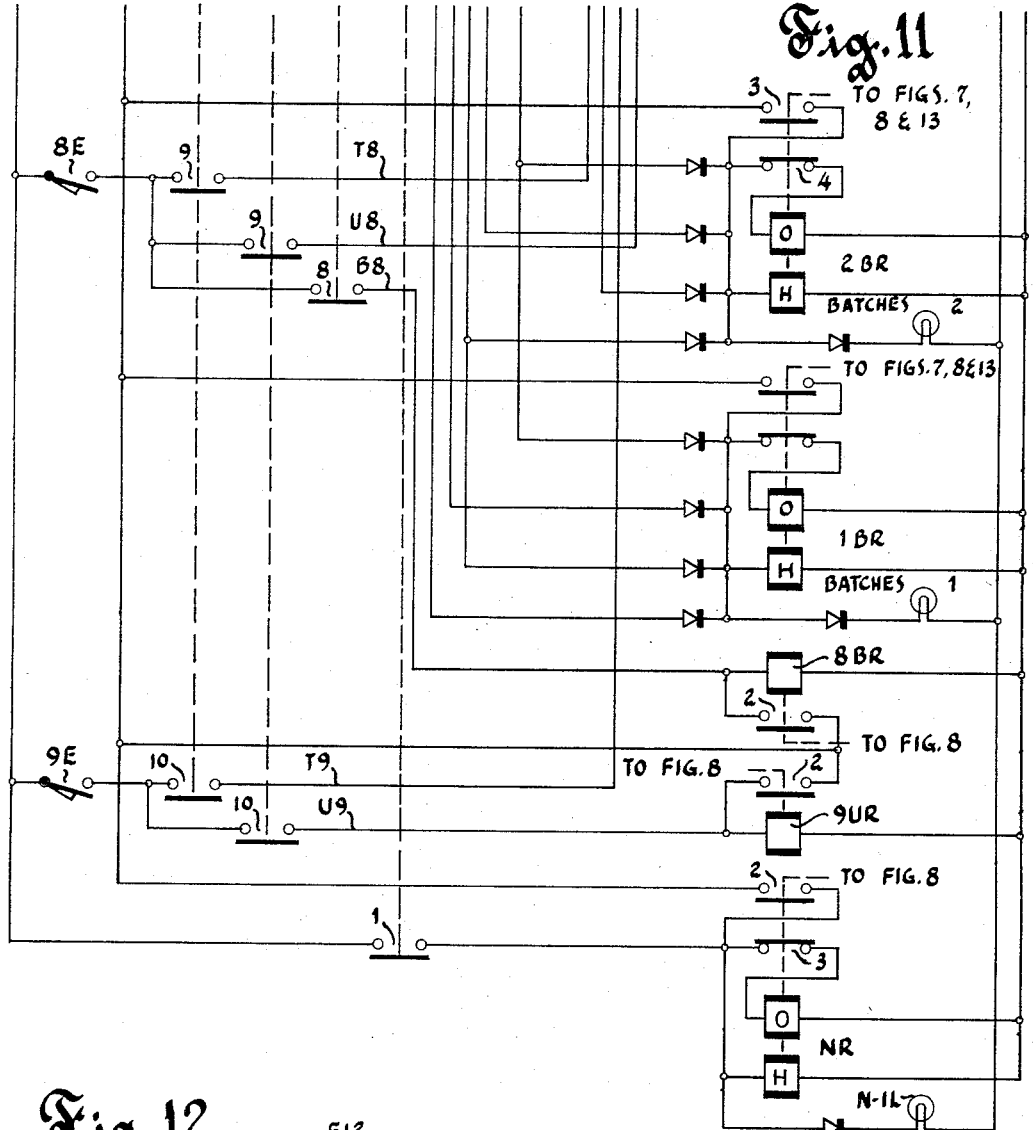
FIG. 12 is a graphic illustration of the cam switch in the card reader.

As shown in FIG. 12, switches CBS2 through CBS7 are operated by cams of the card reader in a particular order. These cam switches are also shown in FIGS. 7, 8 and 9 and function to control the system. In this cam development in FIG. 12, the shaded portions represent closed conditions of the switches and the unshaded portions represent open conditions of the respective switches. For each operation of the card reader to move a punched card from the card hopper to an intermediate position called the "second reading position," this rotary cam switch will operate through one revolution. And for each operation of the card reader to move the punched card from the second reading position through the reading head and to move another punched card from the hopper to the intermediate position (second reading position), this rotary cam switch will operate through another revolution. It will, therefore, be apparent that it takes initially two revolutions of the cam switch to read the first card and from then on it takes one revolution to read each additional punched card.

As shown in FIG. 12, the clutch latch position of the card reader is at 310 degrees which is the stopping position of the switch. As the card reader functions to draw the first card from the hopper to the second reading position, it will drive this cam switch from the 310 degree stopping position through 360 degrees (0 degree) all the way around to the 310 degree position. Then as the first card passes through the reading head and another card is drawn from the hopper, this cam switch will again be driven a full revolution from 310 degrees all the way around to the 310 degree point, which is the stopping position of the card reader. At this point, cam switches CBS2 through CBS6 are open and cam switch CBS7 is closed as shown in FIG. 7.

OPERATION

To prepare the system for operation, the drive motor must be started and direct current power must be connected to the D.C. supply lines. This drive motor is the one shown in FIGS. 2-4 which powers the card reader and the card transport. For these purposes, power-on switch PNS in FIG. 7 is momentarily pressed to energize relay OR through normally closed power-off switch PFS and to light power-on lamp PN. Relay OR closes contacts 1 and 2 to connect drive motor DM across A.C. supply lines AC1 and AC2 to start the motor running. Contact 3 of relay OR closes a self-maintaining circuit in shunt of the power-on switch so that the latter may be released to reopen. Relay OR opens contact 4 to extinguish the power-off lamp and closes contact 5 to energize the D.C. regulated power supply circuit PSC whereby direct current power is now applied to supply lines DC1 and DC2.

Application of direct current power of 48 volts or the like to lines DC1 and DC2 causes certain conditions to be established as follows. Relay TCR in FIG. 7 energizes across lines DC1 and DC2. This is a terminal connector relay in the stacker control circuit which opens its four normally closed contacts TCR1 to TCR4 in FIGS. 13 and 14 when it is energized to disconnect the manually settable stacker controls so that the stacker can then be placed under the control of the programmer as hereinafter described. Card feed stop indicator lamp CFP in FIG. 7 is lit in a circuit extending through contact 3 of relay SR to indicate that card reading has not been started. Assuming that air pressure has been applied to the gluing system, switch APS in FIG. 7 is closed as aforesaid to light air pressure "on" lamp APN. Bulk operation indicator lamp BO is lit in a circuit extending through contact 3 of relay PCTR. As will be apparent, the system is normally set for bulk operation and a button must be pressed to transfer it to programmed operation. It automatically resets to bulk operation whenever power is disconnected after programmed operation.

The aforesaid application of power to the D.C. lines also energizes bulk operation relay BOR in FIG. 7 in a circuit extending through contact 2 of relay MR and contact 4 of relay PCTR. Relay BOR closes its contact 1 in FIG. 8 to complete a self-maintaining circuit and closes its contact 2 to energize bulk operation auxiliary relay BORR in a circuit extending also through contact 2 of card feed start switch SS. This causes relay BORR to close contact 1 to complete a self-maintaing circuit through contact 2 of timer TRR. Relay BORR opens contact 2 in the circuit of relay LBSRR and opens contact 3 in the circuit of relay STCR.

A pile of punched cards being in the hopper of the card reader and hopper limit switch HLS in FIG. 8 closed, feed relay FR energizes in a circuit extending also through contact 3 of relay RLSRR across the D.C. lines. Relay FR closes contact 1 in FIG. 7 in the circuit of the card reader clutch solenoid and closes contact 2 in FIG. 8 to complete a self-maintaining circuit through contact 3 of relay MRR.

The system is now in a preset condition with power "on" wherein the stacker will operate under bulk operation so that each stack will have the same preset number of newspapers as determined by manual selector dial settings. A button must be pressed to preset the system for programmed operation wherein the number of newspapers in each stack and the number of batches per stack are controlled by the card reader.

Pressing the programmed operation switch POS in FIG. 7 to close its contacts causes energization of program control transfer relay PCTR through contact 1 of timer TRR and the normally closed bulk operation switch BOS. Relay PCTR closes contact 1 to prepare a manually controllable circuit to enable operation of card feed start relay SR. Relay PCTR closes at contact 2 a self-maintaining circuit. Relay PCTR also opens contact 3 to extinguish bulk operation indicating lamp BO and opens contact 4 to deenergize bulk operation relay BOR.

The system is now ready for programmed operation which can be initiated by pressing the card feed start switch SS in FIG. 7. Contact 1 of the card feed start switch closes to energize start relay SR and to ignite the card feed start lamp CFS through contact 1 of the aforementioned program control transfer relay PCTR and the normally-closed card feed stop switch PS. Contact 2 of the card feed start switch in FIG. 8 opens to deenergize bulk operation auxiliary relay BORR.

Start relay SR closes at contact 2 a self-maintaining circuit. Relay SR opens contact 3 to extinguish card feed stop lamp CFP, closes contact 4 to ignite the programmed operation indicating lamp PO and closes contact 1 to energize the card reader clutch solenoid CS in FIG. 7. The circuit for the clutch solenoid extends also through contact 1 of the maintaining relay MR and in a first circuit through the then closed contact 1 of feed relay FR and in a parallel circuit through contact 1 of relay MRR and cam switch CBS7.

Relay BORR being deenergized as aforesaid opens its maintaining circuit at contact 1, closes a point in the circuit of relay LBSRR at contact 2 and at contact 3 completes an energizing circuit for stacker transfer control relay STCR through contact 2 of relay ER. Relay STCR opens its contacts 1, 4, 6 and 7 and closes its contacts 2, 3, 5 and 8 in FIGS. 13 and 14 to transfer the stacker counting control unit from manual selector control to program control.

Energization of the clutch solenoid as aforesaid causes engagement of the card reader clutch to cause drive motor DM to start the card reader on a cycle of operation and concurrently therewith to run the card transport in the console. In this first cycle of operation, the card reader draws the lowermost punched card from the pile in the hopper to a point just beyond the intermediate or "second reading position" wherein the card closes limit switch LS2 in FIG. 8 as it passes thereto. This cycle of operation involves one revolution of the cam switch shown in FIG. 12 from the 310 degree point all the way around to the 310 degree point. At the start, cam switch CBS7 in FIG. 7 is closed as shown in FIGS. 7 and 12.

The card reader is also provided with a rotary switch that is driven one revolution for each cycle of operation thereof and this rotary switch has a contact E12 shown in FIG. 8 which closes and reopens as the card reader passes row 12 on the card at about the 10 degree point as depicted in FIG. 12. At row 12 on the first revolution, contact E12 closes momentarily without effect since contact 1 of relay RLSR is open. On the second and subsequent revolutions, contact E12 will perform a function as hereinafter described. This rotary switch also has contacts 0E to 9E shown in FIGS. 9, 10 and 11 which close at the reading of rows 0 to 9, respectively, on the punched card.

At the proper point in the first revolution the first punched card reaches the intermediate position and closes switch LS2 in FIG. 8. This causes energization of reading relay RLSR across the D.C. supply lines. This relay closes contact 1 without effect and closes contact 2 to energize last cycle relay LCR across the D.C. lines. Relay LCR closes contact 1 to complete a self-maintaining circuit through contact 3 of relay MR and closes contact 2 in FIG. 9 in the card reader circuit. From then on to the end of the first revolution switch LS2 remains closed. On the first revolution at 320 degrees as indicated in FIG. 12, contact CBS7 opens but the clutch solenoid is maintained through contact 1 of relay FR in parallel therewith. At 325 degrees, contact CBS6 in FIG. 8 closes without effect since contact 1 of relay RLSRR in series therewith is open. Contacts CBS2–CBS5 close and open as shown in FIG. 12. Contact CBS7 recloses and contact CBS6 reopens during the remainder of the first revolution all without effect since contact 4 of relay RLSRR is open.

The card reader clutch is constructed and arranged so that it will engage when solenoid CS is energized and will remain in engagement for the remainder of the revolution to the stopping point even if solenoid CS is deenergized in the meantime. This enables the clutch solenoid to be deenergized at any time after the start of the card reader cycle but the cycle will be completed to the normal stopping point at 310 degrees.

The first revolution of the card reader has now been completed and the first punched card has been drawn from the hopper to the intermediate point so that switch LS2 is closed. However, since clutch solenoid CS remains energized, the card reader will not stop after the first revolution but will proceed to go through a second cycle. During this second cycle, the first punched card leaves its intermediate position and passes through or past the reading head shown at the upper portion of FIG. 9. Concurrently, therewith, a second punched card is drawn from the hopper to the intermediate position.

Near the start of this second cycle or second revolution at 320 degrees as shown in FIG. 12, contact CBS7 opens to interrupt the lower parallel branch in the clutch solenoid circuit in FIG. 7. Then at 325 degrees, contact CBS6 closes without effect at this time. This contact performs a useful function during formation of the last batch of a stack as hereinafter described.

At the start of reading of row 12 of the first punched card in the second revolution when the second punched card has already engaged limit switch LS2, rotary switch contact E12 closes momentarily at the 10 degree point. As a result, reading auxiliary relay RLSRR energizes through contact E12 and contact 1 of relay RLSR in FIG. 8. Relay RLSRR closes contact 2 to complete a self-maintaining circuit across lines DC1 and DC2 which maintains this relay energized until D.C. power is disconnected. Relay RLSRR also closes contact 1 to energize maintaining auxiliary relay MRR through contact 3 of relay LBSRR. Relay RLSRR opens contact 3 in the energizing circuit of feed relay FR and closes contact 4 in FIG. 9 to prepare the reader head for operation.

Upon being energized as aforesaid, relay MRR opens contact 1 in one of the two parallel branches of the clutch solenoid circuit, opens contact 2 in the maintaining circuit of relay LBSRR, opens contact 3 in the maintaining circuit of relay FR and closes contact 4 in FIG. 9 to prepare a maintaining circuit for the register relays.

Since both the energizing circuit and the maintaining circuit of feed relay FR are now open, this relay deenergizes and reopens contacts 1 and 2. Contact 2 in FIG. 8 further interrupts its maintaining circuit and contact 1 in FIG. 7 deenergizes clutch solenoid CS since contact 1 of relay MRR in parallel also just opened. Although the card reader clutch solenoid deenergizes at this point, the clutch remains in engagement so that the motor drives the card reader through the second cycle to its stopping point.

At this point, a brief description of the punched card might be informative. There are eighty columns and twelve rows of possible places for punched holes on the card. Of the eighty columns only four columns are needed for purposes of this description, these being columns 76, 77, 78 and 79, for exemplary purposes, in which are punched the tens and units digits of the number of papers in the batch, the units digit of the number of batches in the stack and the $N-1$ code, respectively. These twelve rows on the punched card are numbered 12, 11, 0, 1, 2, 3, 4, 5, 6, 7, 8 and 9 and the reading of these rows is synchronized with the cam switch as shown in FIG. 12. It is apparent from FIG. 12 that the cam switch rotates from the 310 degree stopping point to 360 degrees which is zero degrees and then from zero degrees to 310 degrees and that row 12 on the punched card is read first and then rows 11, 0, 1, 2, etc. to row 9 in that order. However, only rows 0 through 9 are used for coding purposes of this invention and rows 12 and 11 are available for other codes. The tens digit of the number of papers per batch is punched in rows 0 to 9 of column 76. The units digit of the number of papers per batch is punched in rows 0 to 9 of column 77 but row 9 is used only for control purposes since a complement to 9 binary code is registered and there is no zero binary bit register relay. The units digit of the number of batches per stack is punched in rows 1 to 8 of column 78 but row 8 is used only for control purposes since a complement to 8 binary code is registered and there is no zero binary bit register relay. The $N-1$ code is punched in row 1 of column 79. The positions of the holes in the card for an exemplary code 1541 have been shown at the power portion of FIG. 12 to relate them to the closed intervals of cam switches CBS2 shown at the upper portion of FIG. 12. This relationship will be described in more detail hereinafter in connection with reading of the codes from the card.

When the first punched card leaves the intermediate or second reading position and is drawn toward the reading head, switch LS2 reopens without effect as relays RLSRR and LCR are self-maintained. At the same time, a second card is drawn from the hopper and will reclose switch LS2 upon reaching the second reading position.

The first punched card is then drawn into the reading head where reading of the punched holes is started.

Referring to FIG. 12, it will be seen that the rows in the punched card are spaced an angular distance of 18 degrees apart from one another. A hole in the card has a length in the direction of movement equal to the space between rows. Therefore, for 18 degree spacing as shown in FIG. 12, the hole will be 9 degrees long and the space between rows will be 9 degrees long. Although in the example chosen rows 12, 11 and 0 have no holes, it will be seen in FIG. 12 that for row 12 contact CBS3 closes at 359 degrees and opens at 15 degrees whereas contact CBS2 closes at 10 degrees and reopens at 26 degrees for an overlap of 5 degrees during which the reading head circuit in FIG. 9 is closed to the punched card. Contacts CBS5 and CBS4 similarly operate to provide a closed interval of 5 degrees for row 11. Then contacts CBS3 and CBS2 operate again for row 0 to close the reading circuit for a 5 degree interval, etc.

The system is arranged so that the cam switch contacts close the circuit last and open it first relative to the feeler contacts which sense the holes in the card so that any contact wear or burning will take place at the cam contacts and not at the reading head feeler contacts which are not as readily replaceable. As illustrated in connection with row 1 in FIG. 12 wherein two holes appear in the punched card, one hole for the tens digit in row 76 and one hole for the $N-1$ code in row 79, feeler brushes 76a and 79a fall through the holes in the card and make contact two degrees ahead of the closure of the circuit by the cam contacts. As shown at the lower portion of FIG. 12, the reader brushes make contact at 62 degrees and thereafter at 64 degrees of rotation contact CBS4 closes the circuit to operate the tens punch relay TPR and $N-1$ punch relay NPR. The reading circuit is opened by cam contact CBS5 at 69 degrees and thereafter at 71 degrees the feeler brushes are disengaged from the contact roller by the portion of the card between rows.

The card is then driven from row 1 to and through the remaining information containing rows 2, 3, 4, 5, 6, 7, 8, 9 and the punched codes are read and registered on the information relays. Although an 80 column card is used, only four columns as aforesaid are required for the tens and units digits indicative of the number of papers in a batch, for the digit indicative of the batches in the stack and for the $N-1$ indicative to allow a variation in alternate batches of one newspaper. Thus, if the stack requires two batches of 15 newspapers each, the code will be 152. If the stack requires two batches totaling 29 newspapers, the code will be 152 $N-1$ indicating that the first batch will have 15 newspapers and the second batch will have 15-1 or 14 newspapers. Likewise, if the code calls for more than two batches and an $N-1$ code appears, each alternate batch such as the second, fourth, etc., will have $N-1$ or one less newspaper than the other batches. In this manner, any desired number of newspapers can be placed in any stack. The other columns on the card can be used for recording additional information such as the total number of papers in a stack, and the customer number or address for printing purposes. However, of such information, only the stack forming information appearing in the aforesaid four columns on the card will be considered herein.

Let it be assumed that the four columns of the card are punched in accordance with the numbers 1541. The first two digits indicate the number of newspapers in the batch, the third digit indicates four batches in the stack, and the fourth digit indicates $N-1$, that is, that the second and fourth batches will have fourteeen newspapers for a total of 58 newspapers in the stack. As each row of the card, 0 through 9, passes the brushes, the cam contacts will momentarily close to allow registration of the information punched therein. Also, rotary switch contacts 0E, 1E, 2E, 3E, 4E, 5E, 6E, 7E, 8E and 9E in FIGS. 9, 10 and 11 will close as the representative rows are being read to allow registration of the information. For the above code, the 0 row will pass the brushes without effect. When row 1 reaches the brushes, the tens brush and the $N-1$ brush will make contact through punched holes with the contact roller as hereinbefore described. It may be assumed that the $N-1$ code if used, is always punched in row 1. Immediately thereafter, contact CBS4 in FIG. 9 closes to complete the reading circuit therethrough and through contacts CBS5, RLSRR4 and LCR2 and the contact roller and then in parallel through brushs 76a and 79a (corresponding to columns 76 and 79 on the card) for energizing tens punch relay TPR and $N-1$ punch indication relay NPR.

Tens punch relay TPR being energized as aforesaid closes its contacts 1 through 10. However, only contact 2 is effective since only contact 1E, associated therewith, of the rotary switch contacts is closed. Contact 2 of relay TPR completes an energizing circuit through contact 1E, tens one conductor T1, an isolating unidirectional diode and contact 3 of relay 8TR to the operate coil 0 of tens digit binary bit relay 8TR and completes an energizing circuit through contact 1E, the other branch of conductor T1, a diode and contact 3 of relay 1TR to operate coil 0 of tens digit binary bit relay 1TR. This results in registration of the binary code bits 8 and 1. More specifically, tens digit 1 which was read in decimal form, that is, registration of the binary code bits 8 and 1. More specifically, relay 8TR closes its contact 8TR1 in FIG. 8 to complete a point in the circuit of maintaining relay MR. Relay 8TR at its contact 2 in FIG. 9 closes a self-maintaining circuit to its holding coil H and at its contact 3 opens the circuit to its operating coil 0. Relay 8TR also closes its contact 8TR4 in FIG. 14 to prepare for transfer of the registered binary code bit 8 to the predetermined counter in the stacker counting control circuit as hereinafter more fully described. Relay 1TR closes contact 1 in FIG. 8 in parallel with contact 8TR1 in the circuit of relay MR, closes contact 2 in FIG. 9 to complete a maintaining circuit for its holding coil H and opens contact 3 to interrupt the circuit of its operating coil 0. Relay 1TR also closes its contact 1TR4 in FIG. 14 to prepare for transfer of the registered binary code bit 1 to the predetermined counter in the stacker counting control circuit as hereinafter described.

$N-1$ punch relay NPR in FIG. 9 being energized as aforesaid closes contact 1 in FIG. 11 to energize the operating coil 0 of relay NR. The latter relay closes contact NR1 in FIG. 8 to energize relay NRR, closes contact 2 to complete a self-maintaining circuit for its holding coil H and opens contact 3 to interrupt the circuit to its operating coil 0.

Auxiliary relay NRR in FIG. 8 being energized as aforesaid closes contact 1 to prepare at self-maintaining circuit for closure by the last batch start relay LBSR later on. Relay NRR also closes contact 2 and opens contact 3 in FIG 14 to transfer the $N-1$ information to the stacker counting control circuit as hereinafter more fully described.

Row 1 of the punched card has now been read and the tens digit translated into binary form and registered as the complement to 10 of its numerical value and along with the $N-1$ code has been transferred to the stacker counting control circuit. The punched card now is driven from row 1 past rows 2 and 3 which contain no holes to row 4 which has a hole in column 78 indicative of four batches for the stack. As the punched card is driven, contact CBS5 opens the reading circuit to deenergize relays TPR and NPR and the card then further interrupts the circuit at the brushes.

At row 4, contact CBS3 closes first, brush 78 falls through the hole in the card and contact CBS2 then closes to energize batch punch relay BPR. At this time, the rotary switch driven by the card reader has also closed contact 4E in FIG. 10. As a result, a circuit is completed through contact 4E, contact 4 of relay BPR, batches for conductor B4 and then through the unidirectional diode and contact 4 of relay 4BR to energize operating coil 0 of binary bit relay 4BR. This relay opens contact 4BR1 in FIG. 7 in the circuit of the program control transfer relay, closes contact 4BR2 in FIG. 8 to complete another point in the circuit of relay MR, closes contact 3 in FIG. 10 to complete a self-maintaining circuit for its holding coil H and opens contact 4 to interrupt the circuit of its operating coil 0. Relay 4BR also closes contact 4BR5 in FIG. 13 to prepare a circuit for transfer of the batch information to the batches counter in the stacker counting control circuit as hereinafter more fully described.

Row 4 of the punched card has now been read and the batch information translated into binary form and registered as the complement of 8 of its numerical value and transferred to the stacker counting control circuit. The punched card now is driven by the card reader from row 4 to row 5 which has a hole in column 77 indicative of the units digit of the number of papers in the batch. As the punched card is driven, contact CBS3 opens the reading circuit to deenergize relay BPR and the card then further interrupts this circuit at the brushes.

At row 5, brush 77 falls through the hole in the card and contact CBS4 then closes to energize units punch relay UPR. At this time, the rotary switch has also closed contact 5E in FIG. 10. As a result, a circuit is completed through contact 5E, contact 6 of relay UPR, units five conductor U5 and then through the unidirectional diode and contact 3 of relay 4UR to energize operating coil 0 of units digit binary bit relay 4UR. This energization of "4" units relay 4UR constitutes registration of the units digit 5 read from the card as the complement of 9 in binary form, that is, as binary bit 4. Relay 4UR closes its contact 4UR1 in FIG. 8 to complete the energizing circuit for relay MR through the then closed contact 8TR1 and 4BR2. Relay 4UR also closes contact 2 in FIG. 10 to complete a self-maintaining circuit for its holding coil H. Relay 4UR opens contact 3 to interrupt the circuit of its operating coil 0. Relay 4UR additionally closes contact 4UR4 in FIG. 14 to prepare a circuit for transfer of the units digit code to the units digit counter in the stacker control circuit as hereinafter more fully described.

All of the holes have now been read from the punched card and the card is driven from row 5 through rows 6 to 9 beyond the reading station and held just at the card transport entry point. As the card is driven past row 5, relay UPR is deenergized. The tens digit 1, and the units digit 5, the batch digit 4 and the N—1 code have been read and registered as hereinbefore described. This indicates that there will be 15 newspapers in a batch with every second batch having one less newpaper and 4 batches for a total of 58 newspapers in the stack. The tens digit 1 has been used to prepare for setting the tens counter at 9 or complement of 10 and the units digit 5 has been used to prepare for setting the units counter at 4 or complement of 9. Thus, the counters will be preset at 94 and will count out at a count of 109 when 15 newspapers have been counted. The batches per stack counter will be preset at 4 or complement of 8 so that it will count out at a count of 4. The N—1 code will cause a count to be absorbed on each of the second and fourth batches to form a batch of 14 newspapers as hereinafter described.

It will be recalled that relay MR in FIG. 8 was energized when the units digit was read from row 5 and registered on relay 4UR. Relay MR opens contact 1 in FIG. 7 in the reader clutch solenoid circuit, opens contact 2 in the circuit of bulk operation relay BOR, opens contact 4 in FIG. 8 in the circuit of error relay ER to prevent operation thereof since the tens, units and batches codes were properly registered and opens contact 3 to interrupt the maintaining circuit of last cycle relay LCR.

As will be apparent, the circuit of the reading head at the upper portion of FIG. 9 must be maintained open at all times before the first card is passing and after the last card has passed between the contact roller and brushes to prevent registration of erroneous codes. This is for the reason that all four brushes contact the roller when a card is not therebetween. For this purpose, contact E12 in FIG. 8 does not close until the start of reading of row 12 of the first card so that contact 4 of relay RLSRR maintains the reading head circuit open until that time. The card reader is arranged so that each card engages limit switch LS2 to energize relay LCR which is maintained until that card has passed between the brushes and the contact roller and the code therefrom has been registered. It will be apparent that after the last card passes limit switch LS2 relay LCR maintains the reading head circuit closed until the last card has been read. In this manner, relay LCR controls the reading head circuit after the last punched card has passed limit switch LS2 even if an additional card is not coming from the hopper to enable use of the last card as an address label.

The manner in which the stacker counting control unit shown in FIGS. 13 and 14 receives and utilizes the registered codes will now be described. Referring to the lower left-hand portion of FIG. 13, it may be assumed that a timing relay operates a suitable time interval after D.C. power has been connected to the system as hereinbefore described to close contact 15CR. This causes energization of reset relay RR and operation of its contact to transfer the minus 10 volt source from the "clear" contact to the "normal" contact.

The stacker counting control unit may be "cleared" of any information, that is, set to its zero condition, either manually from reset switch RS in FIG. 13 or automatically by the system from reset relay RR. If the reset switch is moved up to the clear contact, the system is cleared and when it is moved back down to the normal contact as shown, the newspaper counters and the batch counter are preset to the aforementioned complement numbers in accordance with the information on the registers in FIGS. 9, 10 and 11. Similarly, when the reset relay is deenergized, the system is cleared and when this relay is energized, the newspaper and batch counters are preset to complement numbers according to the codes registered from the punched card as hereinafter more fully described.

When a negative voltage is applied to one of the "clear" contacts in FIG. 13, this voltage is applied through conductor 60 to terminal D of the batches per stack control circuit 62 to clear the latter to zero condition. This causes circuit 62 to apply a negative voltage from terminal C or depicted thereat, through conductor 64 to terminal F to clear the programmer circuit 66. This negative voltage at terminal F also disables the newspaper count recognize circuit connected to terminals U1, U8, T2 and T3 of the programmer to prevent any transient signals that might occur while the newspaper counters are cleared to zero from falsely triggering it. This negative voltage is applied also from terminal C of circuit 62 through conductor 67 to terminal H to inhibit the batch count recognition circuit during clearing.

This negative source voltage "clear" signal is also applied in FIG. 13 through conductor 68 and isolating unidirectional diodes to the "clear" input terminals M of the tens and units digit newspaper count binary counters 70 and 72, the tens and units digit first delay count binary counters 74 and 76, the tens and units digit second delay count binary counters 78 and 80, the batches per stack binary counter 82 and to batch count recognition circuit 84. This negative voltage clears these counters to zero condition and keeps circuit 84 from tripping as hereinafter described.

The manual reset switch, if it is being used, is then returned to normal position as shown in FIG. 13. Or if automatic reset is being used, the reset relay operates as aforesaid to normal position to apply negative voltage through its contact and reset switch RS in normal position to terminal H of the batches per stack control circuit. This causes terminal C of batches per stack control circuit 62 to go from negative voltage to ground. This positive-going transient functions in programmer 66 in FIG. 14 to simulate a count-out of the newspaper counter, initiating a normal sequence of operation as hereinafter described.

This positive-going transient is applied from terminal C to terminal S of batches per stack control circuit 62 to provide a voltage at terminal P to operate a relay 11CR or the like for a short time interval to cause delivery of any stack or batch from the stacker.

The nomal sequence of operation resulting from the aforesaid simulated count-out begins with a positive-going voltage appearing at terminal T of the programmer in FIG. 14 which is applied through conductor 86 to terminal D of the N/N1 control circuit 88. This operates circuit 88 to apply from its terminal C a negative pulse and to apply from its terminal E a relatively longer positive pulse. As will be apparent, the negative pulse is applied from terminal C of circuit 88 through conductor 90 as a "clear" signal to the newspaper county binary counters 70 and 72.

The positive pulse is applied from terminal E of circuit 88 to preset the newspaper count counters 70 and 72 to the binary number registered from the punched card. It will be recalled that according to the example chosen, contacts 8TR4 and 1TR4 in FIG. 14 were closed when the binary number having a decimal equivalent of 9 was registered, this being the complement to 10 of the tens digit 1. Also, contact 4UR4 was closed when the binary number having a decimal equivalent of 4 was registered, this being the complement to 9 of the units digit 5. Relays TCR and STCR having also been energized, the positive pulse is applied from terminal E of circuit 88 in FIG. 14 through contact 3 of relay STCR and then in parallel through contacts 8TR4, 1TR4 and 4UR4 to preset the newspaper count tens and units binary counter at 9 and 4, respectively, constituting a presetting at a binary code having a decimal equivalent of 94. It will, therefore, be apparent that when 15 newspapers have been counted, the counter will count out at 109.

From the foregoing it will be apparent that the tens digit manual selector 92 and the units digit manual selector 94 in FIG. 13 have been bypassed and the newspaper count programmed from the punched card has been used in place thereof to preset the binary counters. This positive-going or ground voltage on terminal E has a longer duration than the negative-going clear signal on terminal C of circuit 88 and lasts beyond the end of the clear signal to allow presetting of the newspaper counter. Changing the positions of the manual selector 92 or 94 or closing other register relay contacts now will have no effect on the newspaper counter.

The batches per stack counter 82 in FIG. 13 is cleared to zero and preset in a manner similar to the newspaper counter. It will be recalled that relay 11CR which is connected to terminal P of batches per stack control circuit 62 was operated. The positive-going voltage input at terminal S which caused relay 11CR to operate also causes a negative voltage "clear" pulse to be applied from terminal K and a relatively longer positive voltage presetting pulse to be applied from terminal E of circuit 62. This clear pulse terminates earlier than the presetting pulse so that the latter is applied through conductor 96, contact 2 of relay STCR and contact 4BR5 to preset the batches per stack binary counter 82 to a binary code having a decimal equivalent of 4, this being the complement to 8 of the 4 batches read from the punched card.

The newspapers flowing in an overlapped stream into the stacker actuate paper count switch 98 in FIG. 13. Each newspaper closes and reopens this switch momentarily to energize paper count relay PCR. The two contacts of relay PCR operate anti-bounce flip-flop 100 by the normally closed contact momentarily disconnecting negative voltage from terminal N and the normally open contact momentarily connecting it to terminal U to flip it and then to flop it back to its original position. This causes negative voltage pulses to appear at output terminal P of flip-flop 100. The positive-going trailing end of these pulses is applied to and advances the newspaper counter one count for each newspaper passing the count switch. Counts are accumulated in the newspaper counter, adding onto the preset number already therein. The count pulses are applied to the units binary counter and each time it counts out it applies a pulse to advance the tens binary counter one count in known manner.

When 15 newspapers have passed the count switch and the newspaper binary counter counts out, ground potentials are applied therefrom through conductors 102, 104, 106 and 108 to terminals U1, U8, T2 and T8, respectively, of programmer 66. It is only when the newspaper counter reaches the number 109 that all four of these conductors have ground potential at the same time. Under any other count, at least one of these conductors will have negative voltage. This count-out signal operates the programmer in the same manner as hereinbefore described in connection with the simulated count-out signal to apply clear and preset pulses to the newspaper counter.

The programmer also operates in response to the count-out signal to apply a negative-to-ground voltage signal from terminal P through conductor 110 to terminal H of gear tooth count amplifier 112. Gear 114 is driven by the newspaper conveyor in synchronism therewith and the teeth thereof pulse coil 116 to measure or time the travel of the last newspaper of the batch from the paper count switch to the intercept blade in the stacker as described in the aforementioned Jochem patent. The first delay counter delays interception until the last counted newspaper of the batch has entered the stacker under the intercept blade so that all fifteen newspapers that were counted will go into the proper batch. This signal at terminal H gates the gear tooth count amplifier so that gear tooth pulses are passed therethrough and are applied from terminal K to the first delay counter to advance this counter. In known manner, for each count-out of units binary counter 76 it will apply a pulse to advance tens binary counter 74 one count. The units and tens digit manual selectors 118 and 120 have previously been preset to the proper number depending upon the number of gear tooth pulses required to move a newspaper from the paper count switch below the intercept blade in the stacker. Thus, when the first delay counter reaches this count, a ground potential is applied from the common output CO of the units and tens digit manual selectors 118 and 120 through conductor 122 to terminal H of the programmer. This causes the programmer to apply a negative-to-ground voltage from terminal C through conductor 124 to terminal R of pulse generator 126. As a result, the pulse generator produces a voltage pulse long enough to operate a relay 1CR or the like to raise the exit nip of the pincher rolls above the intercept blade thereby to receive the next and subsequent newspapers on the intercept blade while the batch that was just formed is dropped to the rotary table.

The aforesaid operation of the pulse generator also causes a negative "clear" pulse to be applied from terminal P thereof through conductor 128 to set the first delay counter back to zero condition.

The second delay counter measures the time it takes the last newspaper of the batch that was not intercepted to settle on top of the batch resting on the stacking blades to determine when the batch may be dropped onto the rotating table. The count-out of the first delay counter triggers counting in the second delay counter. For this purpose, the negative-to-ground signal at terminal C of the programmer is also applied through conductor 130 to terminal J to gate the gear tooth count amplifier so that it will start to pass gear tooth pulses from terminal E to the input of units section 80 of the second delay counter. For each count-out of units section 80, it applied one count to tens section 78 in known manner. When the second delay counter reaches the count previously set on its units and tens digit manual selectors 132 and 134, a negative-to-ground potential is applied from the common output CO of these manual selectors, it being passed therethrough from the second delay counter, and then through conductor 136 to terminal D of the programmer. This causes the programmer to function so that the voltage at terminal C goes from ground to negative to terminate the signal and the voltage at terminal E thereof goes from negative to ground.

This neative-to-ground potential is applied through terminal F to operate the pulse generator 126 so as to operate a relay 2CR or the like for a time interval. It may be assumed that relay 2CR controls the stacking blades to drop the batch on the rotary table and that upon completion of this function, limit switches or the like cause lowering of the intercept blade followed by withdrawal and raising thereof to deposit onto the stacking blades the next batch being formed. The pincher rolls are also lowered and the raised intercept blade is extended to prepare for the next interception.

This operation of the pulse generator also causes a negative voltage "clear" pulse to be applied from terminal C through conductor 138 to set the second delay counter back to its zero condition.

The signal which started admission of gear tooth pulses to the first delay counter is also used to advance the batches per stack binary counter on step. For this purpose, the negative-to-ground pulse which was applied from terminal P of the programmer through conductor 110 to gate the gear tooth count amplifier is also applied from conductor 110 through conductor 140 in FIG. 13 to the input terminal of batches per stack binary counter 82 to advance the count therein by one from four to five to indicate that one batch has been formed for the desired four-batch stack.

In the meantime, the newspaper count switch has been counting newspapers for the second batch. The second batch and each alternate batch of the stack, that is, the second and fourth batches in this example, will have either 15 (N) newspapers or 14 (N−1) newspapers depending upon the operation of the N/N−1 control circuit 88 in FIG. 14. Under the N condition, relay NRR is not energized. However, when an N−1 code has been read from the punched card and relay NRR has been energized as in this example, each alternate batch of the stack will have one less or 14 newspapers.

The N/N−1 manual selector switch MS in the upper portion of FIG. 14 is used to manually preset the desired condition. Under the programming control, this manual switch is left in its N position and the N/N−1 control circuit performs the same function automatically under the control of relay NRR as hereinafter described.

What the N−1 code, in effect, does when it is used is to substitute a ground potential signal at point X in the programmer in place of the ground potential signal which otherwise must come to terminal U1 from the 1 bit output of the units digit portion of the newspaper counter. If this signal is applied from a different source, it will be apparent that ground potential will then appear on all four terminals U1, U8, T2 and T8 one count sooner, that is, on the count of 14 of a 15 newspaper batch. In this manner, the count-out signal is applied to the programmer one newspaper sooner to initiate the count-out functions hereinbefore described.

It will be apparent that if this substitute N−1 signal is obtained from a bistable device such as a flip-flop or the like in the N/N−1 control circuit and if batch count pulses are used to operate this flip-flop, then the signal will be applied on only every second batch to obtain one less newspaper. Referring to FIG. 14, it will be apparent that if the manual switch MS is in the N position as shown and relay NRR is not energized, then terminal R of programmer 66 is floating, that is, it is disconnected and has no voltage and will not affect the operation of the programmer. Under this condition, each batch will have the full number of newspapers. Under this condition, since relay TCR and STCR are energized and relay NRR is not energized, negative supply voltage is applied from a source at the N contact of the manual selector switch and contacts 3 and 8 of relays NRR and STCR, respectively, to terminal M of circuit 88. This will hold the flip-flop in circuit 88 in "0" state to maintain a negative voltage on terminal K. This negative voltage will remain on terminal K even if the manual switch is operated to its N−1 contact or if relay NRR is energized to close contact 2 and open contact 3 causing disconnection of this negative supply voltage from terminal M. However, as long as the system is set for N condition and negative supply voltage is connected to terminal M of circuit 88, terminal K of the latter will have negative voltage, terminal R of the programmer will be floating voltagewise and the negative-to-ground pulse emitting from terminal P of the programmer at count-out through conductors 110 and 142 to terminal J of the N/N−1 control circuit cannot change this state of affairs.

Let it now be assumed that relay NRR has been energized to preset the system for the N−1 condition. Negative voltage is now applied from terminal K of circuit 88 through contacts 5 and 2 of relays STCR and NRR, respectively, to terminal R of the programmer during the formation of the first batch of the stack. Contact 3 of relay NRR has disconnected the negative supply voltage from terminal M of circuit 88 so that the flip-flop therein can now be scaled, that is, flipped from state "0" to state "1" in response to a count-out signal at the end of the first batch. The aforementioned count-out signal is applied from terminal P of the programmer through conductors 110 and 142 to terminal J of circuit 88 to scale the flip-flop therein. This causes terminal K of circuit 88 and consequently terminal R of the programmer to shift to ground potential. This ground potential at point X supercedes any signal on terminal U1 to simulate a count-out condition at 14 newspapers of the second batch. The count-out signal of the second batch will again scale the circuit 88 flip-flop back to the "0" state to allow a batch of 15 newspapers in the third batch. And the count-out signal of the third batch will scale the flip-flop once more to terminate the fourth batch at 14 newspapers. At the completion of a stack, the "clear" pulse received at terminal F of circuit 88 will preset the N−1 control flip-flop to the "0" state so that it will always start from this state on the first batch of a stack.

Restoring the manual selector switch to the N contact or restoring relay NRR depending on where the N−1 control came from will restore the flip-flop in circuit 88 to the "0" state regardless of its previous state.

When the batches per stack counter 82 in FIG. 13 reaches the count of seven at the completion of the third batch, this being also the time when the last batch, fourth in this case, is started, a last batch operation is initiated. For this purpose, ground potential appears on all three outputs including the 1 bit, the 2 bit and the 4 bit outputs of counter 82. These ground potentials which indicate a count of seven are recognized in batch count recognition circuit 84 in FIG. 13. This causes operation of circuit 84 to provide a voltage for a time interval at terminal E to operate last batch relay LBS. This relay closes contacts 1 and 2 in FIG. 8 to energize last batch start auxiliary relay LBSRR and last batch start relay LBSR. The circuit for relay LBSRR extends also through contact 2 of relay BORR.

Contact 1 of relay LBSRR opens a moment before contact 1 of relay LBSR closes in FIG. 7 whereby the external circuit of timer TRR does not cycle the timer and start its timing operation.

Relay LBSRR also closes contact 2 in FIG. 8 to prepare a self-maintaining circuit through contact 2 of relay MRR, opens contact 3 to deenergized relay MRR and closes contact 4 in the maintaining circuit of relay ER. It will be recalled that the description of operation has proceeded to the point where the first punched card has been read and the card reader clutch solenoid has been deenergized so that the card reader has completed its second revolution and has stopped at the 310 degree point. As shown in FIG. 12, at this point contact CBS6 in FIG. 8 is open and contact CBS7 in FIG. 7 is closed. Since contact CBS6 is open, the opening of contact 3 of relay LBSRR deenergizes relay MRR.

Relay LBSR also closes contact 2 in FIG. 7 to prevent manual transfer to bulk operation by pressing switch BOS at this time or after start of the last batch, closes contact 3 in FIG. 8 to complete a self-maintaining circuit through the contact of reset relay RER and closes contact 4 to complete the self-maintaining circuit of relay NRR.

Relay MRR recloses contact 1 in the reader clutch solenoid circuit, recloses contact 2 to complete the self-maintaining circuit of relay LBSRR, recloses contact 3 in the maintaining circuit of relay FR and reopens contact 4 in FIG. 9 in the maintaining circuits of the register relays. This causes register relays 8TR, 1TR, 4UR and NR to deenergize. Relay NRR in FIG. 8 is maintained energized, however, to form the last batch with one less newspaper.

These register relays deenergize relay MR in FIG. 8. Relay MR closes contact 1 in FIG. 7 to energize the card reader clutch solenoid, closes contact 2 in FIG. 7 in the circuit of relay BOR, closes contact 3 in FIG. 8 to complete the maintaining circuit of relay LCR and closes contact 4 in the circuit of relay ER.

The second punched card has been engaging limit switch LS2 to maintain relay RLSR energized. Contact 2 of relay RLSR energized relay LCR which closed contact 1 for self-maintaining through contact 3 of relay MR. Relay LCR also closed contact 2 to complete the reading head circuit for the second punched card.

The aforesaid energization of solenoid CS in FIG. 7 starts the card reader which draws the second punched card, which has been engaging limit switch LS2, through the reading head and draws a third card from the hopper to the second reading position at limit switch LS2. In the manner hereinbefore described in connection with the first punched card, the second punched card is read and the codes therefrom are registered on the register relays. At the same time the first punched card has been ejected from the card reader and is removed from the entry point into the card transport. Contact CBS6 energizes relay MRR to open contact 2 and deenergize relay LBSRR which closes contact 1 to cycle timer TRR.

This first punched card as it is driven by the card transport passes by and actuates gluing limit switch GLS shown in FIG. 7 to energize gluing relay GR and light glue applicator indicating lamp GA to indicate that glue is being applied to the card. Relay GR closes contact 1 to energize gluing solenoid GS through contact 1 of relay CRR. This solenoid operates a valve or the like in the compressed air system to cause glue to be forced out of the ports at the ends of the four plastic tubes as the punched card wipes thereover to apply four stripes of glue to the bottom surface of the card. As the card leaves the limit switch GLS, the gluing relay and solenoid deenergize and lamp GA is extinguished. The glued card then passes out of the console and through the hinged transport and is dropped on top of the pile of top wrap with the glued surface down so that it sticks to the top sheet on the pile. In the meantime the fourth and last batch is being formed and will be conveyed past the top wrap table as hereinafter described.

The operation of the batches per stack counter and control circuits will now be described in connection with FIGS. 13 and 14 during formation of the last batch. It will be recalled that recognition by the programmer of each newspaper count-out caused it to apply a ground potential pulse from terminal P to batches per stack binary counter 82. At the end of the fourth batch which is the last batch for this stack, the batches per stack counter will count out and apply a negative-going voltage step from its output terminal B through conductor 144 to terminal J of control circuit 62. This voltage will operate the batches per stack control circuit 62 to provide a voltage at terminal P which will operate a relay 11CR or the like to indicate the end of the stack. As will be apparent, relay 11CR may be used to initiate delivery of the completed stack from the stacker.

The aforesaid operation of batches per stack control circuit 62 also causes a negative voltage "clear" pulse to be applied from terminal K and a positive-going (negative-to-ground) preset pulse to be applied from terminal E which is longer and lasts longer than the "clear" pulse. This clear pulse is applied through conductor 146 to set the batches per stack counter 82 to zero and immediately thereafter the preset pulse acts through conductor 96 to preset the batches per stack counter to a complement of 8 binary code depending upon what number has been read from the second punched card and registered on the batches register relays 4BR, 2BR and 1BR in FIGS. 10 and 11.

The clear pulse is also applied from terminal K of circuit 62 through conductor 148 to terminal F of the N/N−1 control circuit in FIG. 14. This negative "clear" pulse sets the N−1 control flip-flop therein to its "0" state so that the first batch of the next stack will have the full number N of newspapers as hereinbefore described.

This clear pulse is further applied from conductor 146 through conductor 150 to terminal B to inhibit the recognition circuit 84 to prevent accidental triggering thereof when counter 82 is being cleared.

The aforementioned functions following deenergization of last batch start auxiliary relay LBSRR take place during the timing interval of timer TRR which is about three-fourths of a second or long enough for the code from the next (second in this case) card to be read and registered. At the end of this time interval, timer TRR times out and switches its contacts. Contact 1 opens in series with programmed operation switch POS to render the latter ineffective, contact 2 opens in the maintaining circuit of relay BORR and contact 3 closes in the circuit of error relay ER. It will be apparent that if a new code has not been properly registered on the register relays or if no code has been registered because all the cards have been read, relay MR has not energized and its contact 4 is closed. Therefore, contact 4 of the timer energizes error relay ER to indicate the error or failure in registration. Relay ER closes contact 1 to complete a self-maintaining circuit through contact 4 of relay LBSRR and opens contact 2 to restore relay STCR. This is the stacker transfer control relay which restores its contacts 1–8 in FIGS. 13 and 14 to transfer the system to manual information input or bulk operation and to disconnect the register input.

Assuming that the codes have been properly read and registered, relay MR will have operated to open contact 4. Then timer contact 4 closes without energizing the error relay.

When all of the newspapers for the last batch have been counted, the count-out signal is used to energize counter reset relay RER in FIG. 14. When programmer 66 recognizes a count-out ground potential on all four terminals U1, U8, T2 and T8, it will operate as hereinbefore described on actual count-out or simulated count-out to apply a positive-going wavefront, negative voltage to ground potential step, to terminal T. This pulse will operate timed switching circuit 152 to energize counter reset relay RER for a time interval.

As hereinbefore described in connection with simulated count-out, this pulse is also applied through conductor 86 to operate N/N−1 control circuit 88 to provide a clear pulse from terminal C and a preset pulse from terminal E, the latter lasting longer than the former. This clears and presets the newspaper counter in accordance with the code read from the second punched card.

Reset relay RER opens its contact in FIG. 8 to deenergize relay LBSR which reopens contact 1 to reset timer TRR, reopens contact 2 to allow manual transfer to bulk operation, reopens contact 3 in its self-maintaining circuit and reopens contact 4 to deenergize relay NRR if the second punched card did not have an N−1 code. If it has an N−1 code, relay NR will be energized and will have closed contact NR1 in FIG. 8 to maintain or immediately reenergize relay NRR.

The system will then function in the manner described to form a second and subsequent stacks in accordance with the codes on the respective punched cards.

CHANGE OF OPERATING MODE

Change from one mode of operation to the other must be initiated before the last batch of a stack is started if stacks of two or more batches are being formed.

Change from programmed operation to bulk operation is initiated by pressing bulk operation pushbutton switch BOS. It will be apparent that after the last batch has been started contact 2 of relay LBSR will be to complete a circuit through one of the batch relay contacts to shunt the bulk operation switch and to render it ineffective. However, before contact 2 closes, opening switch BOS will deenergize program control transfer relay PCTR. This relay opens contact 1 in the circuit of relay SR, opens self-maintaining contact 2 to extinguish programmed operation indicating lamp PO, closes contact 3 to light bulk operation lamp BO and closes contact 4 to prepare for energization of relay BOR when relay MR deenergizes at start of the last batch.

It will be apparent that after change from programmed operation to bulk operation is initiated the card reader must be allowed to read another card whereby to release the present card associated with the stack being formed and to move it from the entry point into the card transport for conveyance to the top wrap table.

When the next to the last batch ends to energize relay LBS and the last batch starts as hereinbefore described, relays LBSR and LBSRR energize, relay MRR deenergizes, the register relays deenergize but relay NRR is maintained and relay MR deenergizes in the same manner hereinbefore described with one exception. The difference is that since relay PCTR is deenergized, contact 2 of relay MR energizes relay BOR which maintains at contact 1 and at contact 2 energizes relay BORR. The latter relay maintains a contact 1, opens contact 2 without effect and at contact 3 deenergizes relay STCR to effect the transfer from programmed operation to bulk operation in FIGS. 13 and 14.

Upon being deenergized, relay MR closes contact 1 to initiate another cycle of operation of the card reader. For this purpose, contact 1 of relay MR completes a circuit through contact 1 of relay SR, cam switch contact CBS7 and contact 1 of relay MRR to energize card reader clutch solenoid CS. As a result, the card reader moves the punched card associated with the stack being formed from the card transport entry point into the card transport and at the same time reads the card that was engaging limit switch LS2 at the intermediate point and draws the next card from the hopper to second reading position limit switch LS2.

The card which is moved from limit switch LS2 energizes relay RLSR during the time that the card is engaging the limit switch. As aforementioned, contact 2 of relay RLSR energizes relay LCR which is maintained at contact 3 of relay MR and which in turn closes at its contact 2 the reading head circuit to permit reading of the card.

This operation of the card reader also causes cam switch contact CBS6 to close whereby to energize relay MRR. At contact 1 relay MRR opens the card reader clutch solenoid circuit and maintains it open so that the card reader will stop at the end of its cycle and will not be operated any more during the bulk operation period. Relay MRR opens contact 2 to deenergize relay LBSRR, opens contact 3 without effect and closes contact 4 to permit registration of the codes that are now read from the punched card. When the codes are all registered, relay MR again energizes as hereinbefore described and further opens the card reader clutch solenoid circuit at its contact 1. Relay MR also opens contacts 2, 3 and 4 for purposes hereinbefore described.

When the stacker completes the last batch, relay RER restores relay LBSR. It will also be noted from FIG. 12 that when the card reader completes its cycle and stops at the 310 degree position, cam switch contact CBS6 reopens and contact CBS7 recloses. Although contact CBS6 in FIG. 8 reopens, relay MRR is held energized through contact 3 of relay LBSRR which cannot energize, or is locked out, since its circuit is held open at contact 2 of relay BORR. The closure of contact CBS7 is without effect since contact 1 of relay MRR in series therewith is held open.

The system is now in bulk operation with relays MRR, MR, BOR, BORR, RLSR and LCR energized and relays PCTR, LBS, LBSR, LBSRR and STCR deenergized. The clutch solenoid circuit is held open at contact 1 of relay MR and contact 1 of relay MRR. The code from the punched card that has just been read is held on the register relays in readiness for controlling the formation of the next programmed stack when the system is transferred back to programmed operation at some later time. In the meantime, the number of papers per batch and the number of batches per stack and the N or N−1 operation will be controlled from the manual selectors and switch MS in FIGS. 13 and 14.

If single batch stacks are being formed under programmed operation, transfer to bulk operation can be effected at any time by pressing the bulk operation switch. Since the complement to 8 of a single batch is seven, register relays 4BR, 2BR and 1BR will be energized. To permit transfer to bulk operation under this condition, contacts 4BR1, 2BR1 and 1BR1 have been connected in parallel in FIG. 7. As will be apparent, these contacts open the shunt circuit so that bulk operation switch BOS can be pressed to deenergize relay PCTR. The system then operates as hereinbefore described to transfer to bulk operation.

The system can be transferred from bulk operation to programmed operation by pressing programmed operation switch POS before the last batch of a bulk operation stack is started.

Switch POS energizes relay PCTR in a circuit extending also through contact 1 of timer TRR and bulk operation switch BOS. Relay PCTR closes contact 1 to allow energization of relay SR except in a case such as this where the system has previously been in programmed operation and relay SR is maintained energized. Relay PCTR closes contact 2 to complete a self-maintaining circuit so that switch POS can be released to reopen, opens contact 3 to extinguish bulk operation lamp BO and opens contact 4 to deenergize relay BOR. As a result, relay BOR opens its self-maintaining circuit at contact 1 and opens contact 2 to interrupt the energizing circuit of relay BORR. However, the latter relay is self-maintained energized until timer TRR deenergizes it.

When the last batch of the last bulk operation stack is started, the last batch relay LBS contacts 1 and 2 in FIG. 8 close. Contact 1 of the last batch relay closes without effect since contact 2 of relay BORR in series therewith is open. Contact 2 of the last batch relay energizes relay LBSR. It will be recalled that relay LBSRR is still locked out by relay BORR so that its timer control contact 1 in FIG. 7 is closed. Therefore, when relay LBSR closes contact 1, timer TRR starts its timing operation of ¾ second. Relay LBSR also closes contact 2 without effect, closes contact 3 to self-maintain through the contact of reset relay RER and closes contact 4 to maintain relay NRR if it is energized.

When timer TRR times out and switches its contacts, the system goes into programmed operation. That is, timer TRR opens contact 1 without effect since relay PCTR is maintained, opens contact 2 to deenergize relay BORR and closes contact 3 without effect since contact 4 of relay MR in series therewith is open.

Relay BORR opens its maintaining circuit at contact 1, closes contact 2 to remove relay LBSRR from lockout and closes contact 3 to energize stacker transfer control relay STCR. Relay STCR switches its contacts in FIGS. 13 and 14 to transfer from bulk operation to programmed operation.

The last batch of the last bulk operation stack is then completed causing operation of reset relay RER which opens its contact in FIG. 8 to restore relay LBSR.

The system has now been transferred back to programmed operation. Relays PCTR, MRR, RLSR, LCR, MR, and STCR are energized and relays LBSR, LBSRR, BOR and BORR are deenergized.

It will be recalled that prior to transfer from programmed operation to bulk operation, the next punched card was read and the codes therefrom were put on the register relays. This was necessary in order to release the punch card associated with the last programmed stack so that it could accompany the latter. When the system is now transferred back into programmed operation, the codes that have been held on the register relays are now used to form the first programmed stack. When the last batch of bulk operation is completed and the stacker counting control circuit in FIGS. 13 and 14 recognizes a newspaper count-out and a batch count-out, the presetting signals will now be applied through the register relay contacts rather than through the manual selectors to preset the newspaper counter and batches per stack counter in accordance with the codes on the register relays.

Last cycle relay LCR functions to permit reading of the last punched card and conveyance thereof to the pile of top wrap. When the last card engages limit switch LS2 as the next to the last card is read, the last card sets up the reading circuit for itself. This is done by energizing relay RLSR which energizes relay LCR which is self-maintained, when contact 3 of relay MR closes as aforesaid. Now the last card is read and moved to the entry point of the card transport. The system is arranged so that it will cycle the card reader once more to cause the last punched card to be moved from the entry point into the card transport. When the last batch is started, relays MRR and MR are deenergized as aforesaid to energize the card reader clutch solenoid and to cycle the card reader once more although there is nothing left to be read. This causes the last punched card to be moved into the card transport and conveyed to the top wrap table. Since a code is not read, the system will go into bulk operation when the timer TRR times out and energizes relay ER to drop out relay STCR.

CARD RUN OUT

The card reader can be emptied of punched cards by pressing the card run out switch CRO in FIG. 7. This causes energization of card run relay CRR which opens contact 1 to prevent energization of the gluing solenoid and closes contact 2 to energize card reader clutch solenoid CS directly across the DC lines. Thus, the card reader will run continuously to run all the cards out through the card transport without gluing them.

CODED STACK COUNT INDICATION

Figure 10:
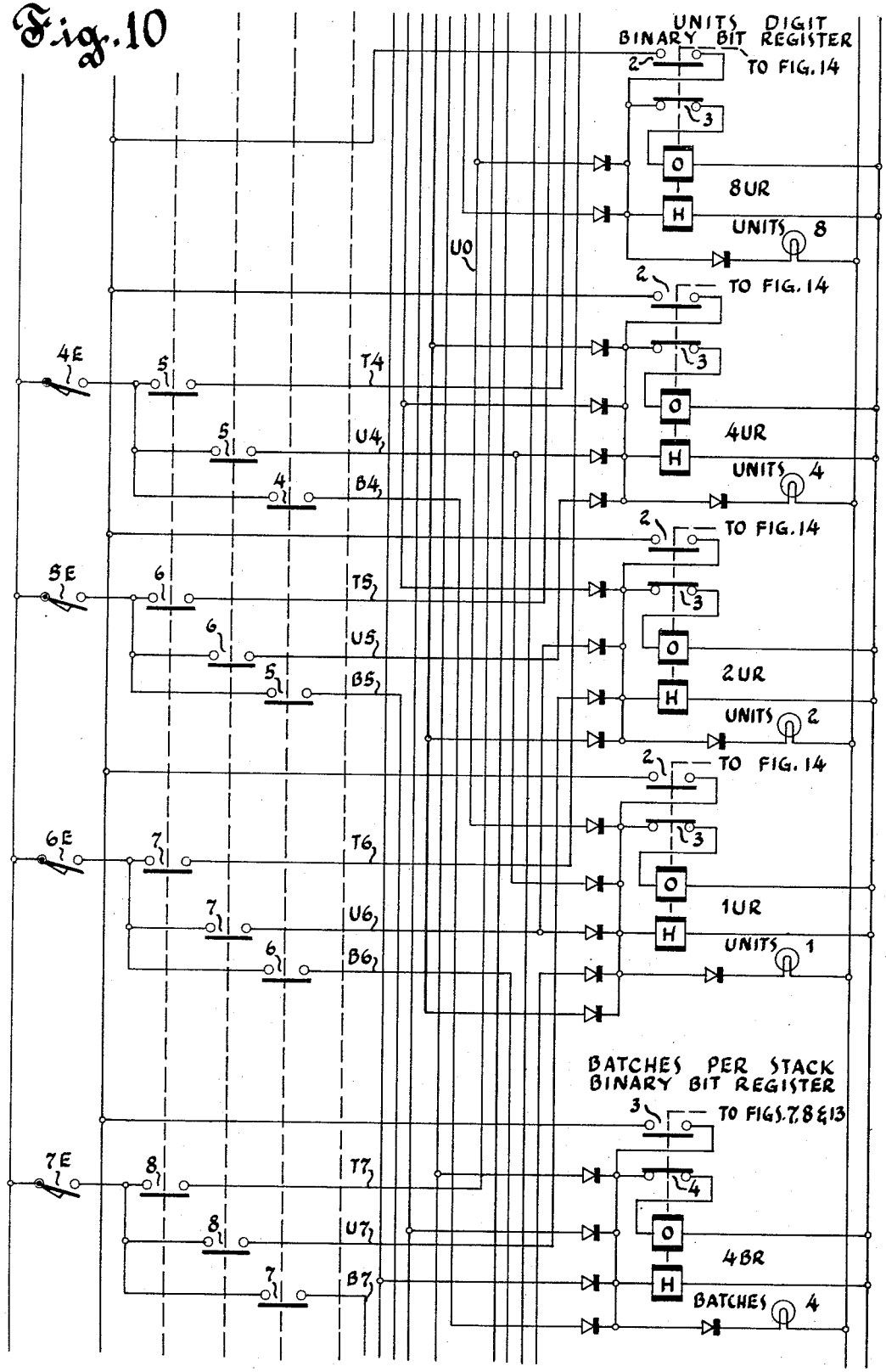

As shown in FIGS. 9–11, each register relay is accompanied by an indicator lamp including tens 8, tens 4, tens 2 and tens 1 lamp for indicating the binary bits of the tens digit. For indicating the binary bits of the units digit, there are provided units 8, units 4, units 2 and units 1 lamps in FIGURE 10. At the bottom of FIG. 10 and in FIG. 11, batches 4, batches 2 and batches 1 lamps are provided for indicating the binary bits of the batches per stack binary registration. And in FIG. 11, an N–1L lamp is provided for indicating registration of an N−1 code. These lamps are connected in series with respective isolating diodes to one side of the holding coils of the respective register relays and then through a test-off switch TOS in FIG. 9 in common to the other side of such holding coils. If the TEST button of the switch is pressed to close it, the lamps associated with energized register relays will be lit to indicate the registered codes. If the OFF button is pressed to open switch TOS, the lamps, will be extinguished.

Since complements of the numbers are registered, the coded stack count indication requires interpretation. Thus, 15 newspapers per batch and 4 batches per stack are indicated by tens lamps 8 and 1, units lamps 4 and batches lamp 4 being lit. This indication of 94 must be substracted from 109 to find the papers per batch. And the indication of 4 must be substracted from 8 to find the batches per stack Lamp N–1L being lit indicates N−1 and the lamp being off indicates N.

While the apparatus hereinbefore described is effectively adapted to fulfill the objects stated, it is to be understood that we do not intend to confine our invention to the particular preferred embodiment of programming console for counter stacker disclosed, inasmuch as it is susceptible of various modifications without departing from the scope of the appended claims.

We claim:

1. In a system for stacking predetermined numbers of units of flexible material flowing in a stream, in combination:
    a support,
    means for stacking a predetermined number of such units on said support to form a batch and for accumulating one or more batches to form a stack;
    and control means for controlling said stacking means automatically to vary said predetermined number to deliver successive stacks having desired different numbers of units in accordance with a predetermined program;
    said control means comprising:
    means for registering information indicative of the number of such units to be included in each batch and the number of batches to be included in each stack;
    a code bearing medium for each stack;
    means for reading said code bearing media and for introducing the information therefrom into said registering means;
    and means for controlling said stacking means in accordance with the registered information.

2. The invention defined in claim 1 together with:
    means for transporting each code bearing medium after the informatiion thereon has been read to a place where an operator can apply it as an address label to the stack .

3. The invention defined in claim 2, together with:
    means for applying glue to each code bearing medium as it is being transported away from said reading means.

4. The invention defined in claim 3, together with:
means for dropping the glued code bearing medium on a pile of top wrap beside the path of travel of the stack before the associated stack arrives thereat to enable an operator to place a top wrap with the address label glued thereto on top of the passing stack.

5. The invention defined in claim 1, together with:
a control code on one of said code bearing media indicating that every second batch of the corresponding stack should have one less unit than the number called for by the code bearing medium;
means for reading and registering said control code;
control means for responding to said registered control code;
means responsive to completion of the first batch for rendering said control means effective on the second batch;
means responsive to completion of the second batch with one less unit for rendering said control means ineffective on the third batch;
and means responsive to completion of the third and subsequent batches of the stack for rendering said control means alternately effective and ineffective.

6. The invention defined in claim 1, wherein:
said reading means and said registering means are housed in a portable console which may be rolled up to a selected stacking means and functionally plugged in to the controlling means therein.

7. In a counter stacker having stack forming means for forming stacks of flat pieces of flexible material and a stacker counting control system for controlling stacker operation and including presettable counters and manually adjustable means for presetting said counters to select a desired number of flat pieces for stacking which number remains constant for a multiplicity of stacks, a programming console which can be readily moved to and functionally connected to any one of a number of such counter stackers and having a program control system for taking over the counting and control functions thereof to provide for variable numbers of flat pieces in the stacks comprising:
a reader for reading a unit of information bearing media for each stack which has been prepared beforehand with codes determining the number of flat pieces per stack and with printed address information enabling subsequent use thereof as address labels on the stacks;
means for translating the codes as they are read into digital codes adapted for use in the presettable counters and for registering said digital codes for use to set the counters in place of the manually adjustable means;
means for initiating operation of said program control system whereby said reader starts reading units of the information bearing media;
means for clearing the stacker counting control system before the start of each stack and for presetting it in accordance with the digital codes that have been registered from the next code bearing unit;
the counter stacker being operable when flat pieces of flexible material flow thereinto to form stacks under the control of the preset counters;
a transport device for moving each code bearing unit after it has been read out of said console;
and means for coordinating the movement of each code bearing unit and the delivery of the respective stack so that they arrive at a common location substantially at the same time to enable use of said unit as an address label on the corresponding stack.

8. The invention defined in claim 7, wherein:
said code bearing units are punched cards and said reader is a card reader which reads one punched card at a time an controls said program control system and the counter stacker to form a stack.

9. The invention defined in claim 7, together with:
a gluing system in said console for applying glue to one surface of each code bearing unit after it leaves the reader.

10. The invention defined in claim 7, together with:
means for transferring the counter stacker from bulk operation in which it is under the control of the manually adjustable means and the stacks are consequently of uniform size to programmed control in which it is under the control of said programming console and vice versa.

11. In a newspaper counter stacker having batch forming means and stack forming means for forming plural-batch stacks with the folded edges reversed and a stacker counting control system for controlling stacker operation and including predetermined counters and manually adjustable means for presetting said counters to select the number of newspapers per batch and the number of batches per stack which numbers remain constant for a multiplicity of stacks; a programming console which can be readily moved to and functionally associated with any one of a plurality of such counter stackers and having a program control system for taking over the counting and control functions thereof to provide for variable numbers of newspapers and batches in the stacks comprising:
a card reader for reading punched cards having standard codes indicative of the number of newspapers per batch and the number of batches per stack, there being one punched card for each stack having coded holes and including printed address information on the top surface;
register-translator means for translating the codes when read into binary codes adapted for use in the predetermined counters and for registering these binary codes for use to set the counters in place of the manually adjustable means;
means for transferring the counter stacker from bulk operation wherein the manually adjustable means exercise control to programmed operation wherein said card reader exercises control;
means for initiating operation of said program control system whereby said card reader starts reading punched codes;
means being responsive first to said initiation of operation of the system and being thereafter responsive to completion of each stack for clearing the stacker counting control system and for presetting the same in accordance with the binary codes read and registered from the next punched card;
the stacker being operable when newspapers flow therein to form stacks under the control of the preset counters;
a card transport for moving each punched card after it has been read out of said console and onto a pile of top wrap;
and means for coordinating the movement of each punched card and delivery of the respective stacks of newspapers so that they arrive at a common location substantially at the same time to enable an operator to place a top wrap and the punched card on top of the corresponding stack.

References Cited
UNITED STATES PATENTS

| | | | |
|---|---|---|---|
| 2,133,262 | 10/1938 | Wolff | 93—93 |
| 3,006,258 | 10/1961 | Jochem | 93—93 |

BERNARD STICKNEY, *Primary Examiner.*

UNITED STATES PATENT OFFICE
CERTIFICATE OF CORRECTION

Patent No. 3,364,827                                                January 23, 1968

Paul J. Schmitz et al.

It is hereby certified that error appears in the above numbered patent requiring correction and that the said Letters Patent should read as corrected below.

Column 1, line 13, for "pluarlity" read -- plurality --; column 4, lines 27 and 28, for "condition" read -- conditions --; column 5, line 17, for "relay RSLRR" read -- relay RLSRR --; column 8, line 71, for "power portion" read -- lower portion --; column 10, line 6, for "representive" read -- respective --; line 30, beginning with "This results" strike out all to and including "8 and 1." in line 33, same column 10, and insert instead -- This results in registration in binary code of the complement to 10 of the tens digit 1 which was read in decimal form, that is, registration of the binary code bits 8 and 1. --; same column 10, line 44, for "main" read -- main- --; line 59, for "at self-maintaining" read -- a self-maintaining --; column 11, line 70, for "fourth batches" read -- fourth batch --; column 13, line 21, for "nomal" read -- normal --; line 30, for "county" read -- count --; column 15, line 22, for "neative-to-ground" read -- negative-to-ground --; line 39, for "on step" read -- one step --; line 61, strike out "the"; column 17, line 11, for "deenergized" read -- deenergize --; line 57, for "removed" read -- moved --; line 63, after "and" insert -- to --; column 19, line 34, after "be" insert -- closed --; column 22, line 10, for "lamp" read -- lamps --; line 32, for "substracted" read -- subtracted --; column 24, line 1, for "an" read -- and --.

Signed and sealed this 11th day of March 1969.

(SEAL)
Attest:

EDWARD M. FLETCHER, JR.                          EDWARD J. BRENNER
Attesting Officer                                     Commissioner of Patents